(12) United States Patent
Isogai

(10) Patent No.: US 9,987,686 B2
(45) Date of Patent: Jun. 5, 2018

(54) COMPLEX, METHOD FOR PRODUCING COMPLEX, DISPERSION LIQUID, METHOD FOR PRODUCING DISPERSION LIQUID, AND OPTICAL MATERIAL

(71) Applicant: TOPPAN PRINTING CO., LTD., Tokyo (JP)

(72) Inventor: Takuya Isogai, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days. days.

(21) Appl. No.: 15/345,028

(22) Filed: Nov. 7, 2016

(65) Prior Publication Data

US 2017/0072472 A1 Mar. 16, 2017

Related U.S. Application Data

(63) Continuation of application No. PCT/JP2015/062517, filed on Apr. 24, 2015.

(30) Foreign Application Priority Data

May 9, 2014 (JP) .................................. 2014-097635
May 15, 2014 (JP) .................................. 2014-101632

(51) Int. Cl.
*B22F 9/24* (2006.01)
*D06M 11/83* (2006.01)
(Continued)

(52) U.S. Cl.
CPC .............. *B22F 9/24* (2013.01); *B22F 1/0055* (2013.01); *D06M 11/83* (2013.01); *D21H 11/16* (2013.01); *D21H 11/18* (2013.01); *D21H 15/02* (2013.01); *G02B 5/208* (2013.01); *B22F 2009/245* (2013.01); *B22F 2301/255* (2013.01);
(Continued)

(58) Field of Classification Search
CPC . B22F 9/24; B22F 1/0055; B32B 5/16; B32B 5/22; D06M 11/83; D21H 11/18; H01B 5/00; H01B 13/00; G02B 5/208
USPC .......... 106/163.01; 427/115; 428/317.9, 323, 428/328; 429/532; 977/902
See application file for complete search history.

(56) References Cited

U.S. PATENT DOCUMENTS

2007/0196641 A1* 8/2007 Ichiki .................... B22F 1/0025
428/323
2012/0000392 A1* 1/2012 Mukai .................... C08B 15/02
106/163.01

FOREIGN PATENT DOCUMENTS

JP 2005-105376 * 4/2005 ............... B22F 1/00
JP 2005-105376 A 4/2005
(Continued)

OTHER PUBLICATIONS

International Search Report issued in International Patent Application No. PCT/JP2015/062517, dated Jul. 21, 2015.
(Continued)

*Primary Examiner* — Bijan Ahvazi
(74) *Attorney, Agent, or Firm* — Foley & Lardner LLP

(57) ABSTRACT

A complex includes a flat plate-like metal fine particle formed of at least one type of metal or a compound thereof and at least one piece of finely-disintegrated cellulose combined with the flat plate-like metal fine particle. At least a part of each piece of the finely-disintegrated cellulose is incorporated into the flat plate-like metal fine particle, and a remaining part is exposed from a surface of the flat plate-like metal fine particle.

10 Claims, 9 Drawing Sheets

(51) Int. Cl.
    *D21H 11/18*      (2006.01)
    *D21H 11/16*      (2006.01)
    *D21H 15/02*      (2006.01)
    *B22F 1/00*      (2006.01)
    *G02B 5/20*      (2006.01)

(52) U.S. Cl.
CPC ....... *B22F 2302/45* (2013.01); *B22F 2998/10* (2013.01); *Y10S 977/773* (2013.01); *Y10S 977/833* (2013.01)

(56) References Cited

FOREIGN PATENT DOCUMENTS

| | | | | |
|---|---|---|---|---|
| JP | 2006-240295 A | 9/2006 | | |
| JP | 2008-001728 A | 1/2008 | | |
| JP | 2008-007646 A | 1/2008 | | |
| JP | 2009-144188 A | 7/2009 | | |
| JP | 2010-216021 A | 9/2010 | | |
| JP | 2014-055323 | * | 3/2014 | ............... B22F 1/02 |
| JP | 2014-055323 A | 3/2014 | | |
| JP | 2014-070158 | * | 4/2014 | ............. C08B 15/04 |
| JP | 2014-070158 A | 4/2014 | | |
| WO | WO-2006/082962 A1 | 8/2006 | | |
| WO | WO-2009/080522 A1 | 7/2009 | | |
| WO | WO-2010/095574 A1 | 8/2010 | | |
| WO | WO-2013/042654 A1 | 3/2013 | | |

OTHER PUBLICATIONS

Extended European Search Report issued in European patent application No. 15789071.6 dated Dec. 8, 2017.

* cited by examiner

COMPLEX, METHOD FOR PRODUCING COMPLEX, DISPERSION LIQUID, METHOD FOR PRODUCING DISPERSION LIQUID, AND OPTICAL MATERIAL

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2015/062517 filed on Apr. 24, 2015, which is based upon and claims the benefit of priority of Japanese Patent Application No. 2014-097635, filed on May 9, 2014, and Japanese Patent Application No. 2014-101632, filed on May 15, 2014, the entireties of which are hereby incorporated by reference.

TECHNICAL FIELD

The present invention relates to a complex, a method for producing a complex, a dispersion liquid, a method for producing a dispersion liquid, and an optical material, and in particular, to a complex of a flat plate-like metal fine particle and finely-disintegrated cellulose.

BACKGROUND

In recent years, aiming to solve a problem of the depletion of fossil resources, there have been actively developed functional materials that use biomasses, which are environmentally conscious materials that are continually available. Among them, cellulose, which is a main component of wood, is the most abundantly accumulated natural polymer material on Earth. Hence, cellulose has been expected as a key material for transition to a resource-recycling society. In wood, a bunch of tens or more of cellulose molecules form a highly crystalline fine fiber (microfibril) having a fiber diameter of nanometer order. In addition, a number of such fine fibers are hydrogen-bonded to each other to form a cellulose fiber to serve as a plant support. Thus, since natural cellulose contained in wood has a stable structure, the natural cellulose is insoluble in solvents but for a special solvent and is poor in formability. Hence, the natural cellulose contained in wood is difficult to handle as a functional material. Thus, approaches have been actively taken to utilize the cellulose fiber in wood by finely disintegrating it until at least one side of the structure thereof becomes nanometer-order length.

For example, as disclosed in Patent Literature 1, repeating machine processing using a blender or a grinder for wood cellulose, a finely-disintegrated cellulose fiber, that is, a cellulose nanofiber (hereinafter, referred to as CNF) can be obtained. It has been reported that the CNF obtained by this method has a minor axis diameter of 10 to 50 nm and a major axis diameter of 1 µm to 10 mm. This CNF has strength 5 or more times greater than that of steel, though the weight of the CNF is ⅕ of that of steel. The CNF has an enormous specific surface area of 250 m²/g or more. Hence, a number of examples have been already reported which use the CNF as a nanofiber for reinforcing resin (e.g. refer to Patent Literatures 2 and 3).

However, because there are essential problems that compatibility between hydrophobic general-purpose resin and a hydrophilic CNF is low and the formation of a complete complex is difficult, the CNF is not yet in practical use.

In addition, as finely-disintegrating technology using chemical treatment, one using acid hydrolysis is known. In addition, in recent years, a new method has been reported in which the relatively stable 2, 2, 6, 6-tetramethylpiperidinyl-1-oxy radical (TEMPO) is used as a catalyst to selectively oxidize the surface of a fine fiber of cellulose (e.g. refer to Patent Literature 4). An oxidation reaction using TEMPO as a catalyst (TEMPO oxidation reaction) enables an environmentally conscious chemical modification that progresses in a water system, at normal temperature, and under normal pressure. When the TEMPO oxidation reaction is applied to cellulose in wood, the reaction does not progress inside the crystal, and only the alcoholic primary carbon of a cellulose molecular chain of the surface of the crystal can be selectively converted into a carboxyl group.

Thus, cellulose single nanofibers (hereinafter, referred to as CSNF) can be obtained which are pieces of cellulose microfibril dispersed in a water solvent by electrostatic repulsion between carboxyl groups introduced to the surface of the crystal. A CSNF that can be obtained from wood by the TEMPO oxidation reaction, that is, a CSNF derived from wood, is a structure having a high aspect ratio where a minor axis diameter is about 3 nm, and a major axis diameter is several tens of nm to several tens of µm. Hence, it has been reported that a water dispersion liquid and a laminate of CSNF have high transparency. In addition, in an application example of using CSNF reported, CSNF is laminated on a transparent substrate to form a gas barrier film for use as a new plant-derived transparent packaging material (e.g. refer to Patent Literature 5).

However, there is a problem that since introducing carboxyl groups to CSNF greatly increases hydrophilicity of CSNF, the dense laminated structure of the CSNF inside the gas barrier film cannot be maintained under a humid temperate climate such as in Japan, thereby lowering gas barrier properties. Hence, practical use of the CSNF as a transparent packaging material is not yet promised at the present time.

As described above, various studies have been made for developing high-performance members using finely-disintegrated cellulose such as CNF and CSNF, which are carbon neutral materials. However, there are still a lot of problems for practical use.

When the size of a metal or a metal oxide decreases to a nanometer order, the metal or the metal oxide may exhibit physical and chemical properties different from those of a bulk state. This phenomenon is known as a so-called quantum size effect which includes lowering of the melting point and surface localized plasmon resonance in the case of metal nanoparticles.

Various applications of metal nanoparticles are expected to develop using the quantum size effect. To maintain the quantum size effect, metal nanoparticles are typically provided in a state of a dispersion liquid. However, since the specific surface area of the metal nanoparticle increases, the metal nanoparticles are easily flocculated with one another in the dispersion liquid, raising a problem of dispersion stability. If secondary particles are formed by the flocculation, the quantum size effect is lost. Hence, various additives are required to be used to prevent the metal nanoparticles from being flocculated with one another.

Meanwhile, in recent years, the use of metal nanoparticles having an anisotropic shape is receiving attention. For example, since the metal nanoparticles each having a plate shape or a rod shape have optical characteristics, electronic characteristics, magnetic characteristics, chemical characteristics, and mechanical characteristics different from those of spherical nanoparticles, anisotropic shape metal nanoparticles are expected to be applied to various fields. Use of metal nanoparticles having such an anisotropic shape is receiving attention in recent years as an approach to fully utilize the quantum size effect.

Among the metal nanoparticles having such an anisotropic shape, application of silver nanoparticles is especially expected. For example, it is known that spherical silver nanoparticles having a particle size of several nm to several tens of nm absorb light with a wavelength of approximately 400 nm due to localized surface plasmon resonance, and hence exhibit yellowish hue. However, anisotropically grown silver nanoparticles do not necessarily exhibit yellowish hue. For example, it is known that an absorption peak of plate-like silver nanoparticles is red-shifted. In this case, it has been confirmed that as an aspect ratio (i.e. particle size/thickness of particles) of the plate-like silver nanoparticles becomes larger, the absorption peak shifts to the long-wavelength side. That is, plate-like silver nanoparticles can be used as an optical material selectively absorbing light with a given wavelength. In addition, if an absorption wavelength is controlled to be within the visible light region, plate-like silver nanoparticles can be obtained which is brightly colored other than yellow, for example, red or blue. Thus, the plate-like silver nanoparticle is expected to be used as a functional color material. Furthermore, the absorption peak can be shifted to the near-infrared region outside the visible light region depending on the aspect ratio of the plate-like silver nanoparticles. In such a case, plate-like silver nanoparticles can also be applied to a near-infrared-absorbing material.

Note that, herein, near infrared rays indicate electromagnetic waves having a wavelength region (approximately between 700 nm to 2500 nm) close to that of the visible light in infrared rays. The near infrared rays have properties close to those of visible light. It is especially known that light having a wavelength in a region approximately between 700 nm to 1200 nm as included in sunlight, is easily absorbed into the surface of an object and then easily converted to thermal energy.

Such a near-infrared-absorbing material that can shield heat rays is a high-value-added functional material. For example, provision of a layer including the near-infrared-absorbing material to windows of a building or an automobile can obtain a heat shielding effect. That is, such a near-infrared-absorbing material which is expected to exert a power-saving effect due to the increase of cooling efficiency can contribute to resolving the power shortage problem in summer.

As described above, various synthetic methods have been proposed for plate-like silver nanoparticles having interesting properties as an optical material. Such synthetic methods include methods used for general purposes which include a synthetic method called a polyol process. According to this polyol process, ethylene glycol, which is one type of polyol, is heated together with a metal salt to 140 to 160° C. with a polymer capping agent to synthesize metal fine particles by means of reducing power of the generated glycol aldehyde. In this case, it has been reported that selecting reducing conditions and an appropriate polymer capping agent can induce anisotropic growth of the silver nanoparticles, thereby obtaining silver nanoparticles having various shapes. For example, Patent Literature 6 discloses an example of producing plate-like silver nanoparticles by using the polyol process.

In addition, Patent Literature 7 discloses a complex (metal nanoparticle supporting CSNF) in which metal nanoparticles are supported by CSNF, as a complex of metal fine particles and CSNF, which is one type of finely-disintegrated cellulose. Patent Literature 7 discloses an example of using the metal nanoparticles supporting CSNF as a catalyst.

CITATION LIST

Patent Literature

Patent Literature 1: JP-A-2010-216021
Patent Literature 2: JP-A-2006-240295
Patent Literature 3: JP-A-2008-007646
Patent Literature 4: JP-A-2008-001728
Patent Literature 5: WO 2013/042654
Patent Literature 6: JP-A-2009-144188
Patent Literature 7: Re-publication of WO 2010/095574

SUMMARY OF THE INVENTION

Technical Problem

However, when plate-like silver nanoparticles are produced by using the polyol process disclosed in Patent Literature 6, a high temperature reaction is required using an organic solvent, and the reaction time becomes long. Hence, the environmental load is heavy. In addition, the aspect ratio is required to be increased to use plate-like silver nanoparticles as a near-infrared-absorbing material. In such a case, at least the particle size in the direction of the plate-like surface is required to be 100 nm or more. As a result, essential problems have been caused that the particle size increases, and the silver nanoparticles easily settle, whereby dispersion is destabilized when the plate-like silver nanoparticles are handled as a dispersion liquid.

In addition, Patent Literature 7 discloses a complex of finely-disintegrated cellulose and a metal fine particle and the use thereof. However, Patent Literature 7 does not at all disclose the possibility of controlling the shape of the metal nanoparticle and the possibility of applying the complex to optical materials, such as a functional color material and a near-infrared-absorbing material.

The present invention has been made in light of such circumstances as stated above and has for its object the provision of a complex of a flat plate-like metal fine particle and finely-disintegrated cellulose applicable to optical materials such as a functional color material and a near-infrared-absorbing material.

In addition, the present invention has an object of providing a method for producing a complex that can be provided by a simple method with a low environmental load.

Furthermore, the present invention has an object of providing a dispersion liquid in which the complex is resistant to settling in a dispersion solvent.

Furthermore, the present invention has an object of providing an optical material available as a functional color material and a near-infrared-absorbing material.

In addition, the present invention has an object of proving a dispersion liquid containing an anisotropic metal nanoparticle having high dispersion stability, in particular, an environmentally conscious new optical material configured by including finely-disintegrated cellulose, which is a carbon neutral material, and a dispersion liquid thereof.

Solution to Problem

To solve the above problems, the inventor of the present application tried to create various organic-inorganic hybrid materials by using finely-disintegrated cellulose, which is a carbon neutral material. As a result, it was found that a complex of a flat plate-like metal fine particle and finely-disintegrated cellulose can be obtained by reducing and precipitating metal in a dispersion liquid of finely-disintegrated cellulose under specific conditions. In addition, it was found that the flat plate-like metal fine particle and the finely-disintegrated cellulose of the obtained complex were in an inseparable state. In addition, it was found that a dispersion liquid containing a flat plate-like metal fine particle/finely-disintegrated cellulose complex can be obtained in which the finely-disintegrated cellulose and the flat plate-like fine particle composed of one or more types of metals including at least silver or a compound thereof are in an inseparable state, by reducing and precipitating one or more types of metals including silver in a dispersion liquid of finely-disintegrated cellulose under specific conditions. Furthermore, the aspect ratio of the flat plate-like metal fine particle/finely-disintegrated cellulose complex can be controlled in a given size by controlling the conditions for the reduction and precipitation reaction. Hence, it was revealed that the dispersion liquid has a maximum value of the absorbance with respect to a given wavelength between 400 nm and 1500 nm, and can be utilized as a functional color material and a near-infrared-absorbing material. In addition, the flat plate-like metal fine particle/finely-disintegrated cellulose complex contained in the dispersion liquid was inhibited from flocculating and settling by steric hindrance and electrostatic repulsion between pieces of finely-disintegrated cellulose, and had very good dispersion stability even when the particle size became 100 nm or more.

To solve the above problems, the present invention employs the following configuration.

A complex according to a first aspect of the present invention includes a flat plate-like metal fine particle formed of at least one type of metal or a compound thereof and at least one piece of finely-disintegrated cellulose combined with the flat plate-like metal fine particle. At least a part of each piece of the finely-disintegrated cellulose is incorporated into the flat plate-like metal fine particle, and a remaining part is exposed from a surface of the flat plate-like metal fine particle.

The flat plate-like metal fine particle and the finely-disintegrated cellulose may be inseparable.

The flat plate-like metal fine particle may be silver.

A particle diameter of the flat plate-like metal fine particle may be two times or more larger than a particle thickness of the flat plate-like metal fine particle.

The finely-disintegrated cellulose may have a carboxyl group on a crystal surface thereof.

Carboxyl group content may be 0.1 mmol or more and 5.0 mmol or less per 1 g of cellulose.

A crystal structure of the finely-disintegrated cellulose may be cellulose type I.

The finely-disintegrated cellulose may have a fibrous form derived from a microfibril structure of native cellulose.

The finely-disintegrated cellulose may have a number average minor axis diameter of 1 nm or more and 100 nm or less, and a number average major axis diameter of 50 nm or more. The number average major axis diameter may be 10 times or more longer than the number average minor axis diameter.

A method for producing a complex of a plate-like metal fine particle and finely-disintegrated cellulose according to a second aspect of the present invention includes preparing finely-disintegrated cellulose, dispersing the finely-disintegrated cellulose in a solvent to obtain a finely-disintegrated cellulose dispersion liquid, mixing the finely-disintegrated cellulose dispersion liquid and a solution containing metal ions with each other to obtain a mixed solution, reducing the metal ions in the mixed solution to grow the flat plate-like metal fine particle, and combining the flat plate-like metal fine particle and the finely-disintegrated cellulose with each other.

The metal ions may be silver ions.

When the finely-disintegrated cellulose is prepared, the finely-disintegrated cellulose having a fibrous form may be prepared.

When the finely-disintegrated cellulose is prepared, a carboxyl group may be introduced to a crystal surface of the finely-disintegrated cellulose.

When the carboxyl group is introduced, an oxidation reaction using an N-oxyl compound may be used.

When the carboxyl group is introduced, the carboxyl group may be introduced so as to be 0.1 mmol or more and 5.0 mmol or less per 1 g of cellulose.

A dispersion liquid according to a third aspect of the present invention includes the complex according to the first aspect dispersed in water or an organic solvent.

An optical material according to a fourth aspect of the present invention includes the complex according to the first aspect.

A dispersion liquid according to a fifth aspect of the present invention includes a complex of finely-disintegrated cellulose and a flat plate-like metal fine particle formed of at least one type of metal or a compound thereof.

In the complex, at least a part of each piece of the finely-disintegrated cellulose may be incorporated into the flat plate-like metal fine particle, and a remaining part may be exposed from a surface of the flat plate-like metal fine particle.

The flat plate-like metal fine particle and the finely-disintegrated cellulose may be inseparable.

The flat plate-like metal fine particle may include at least silver.

A particle diameter of the flat plate-like metal fine particle may be two times or more larger than a particle thickness of the flat plate-like metal fine particle.

A carboxyl group may be introduced to a crystal surface of the finely-disintegrated cellulose.

The carboxyl group of the finely-disintegrated cellulose may be introduced by an oxidation reaction using an N-oxyl compound.

An amount of the carboxyl group introduced to the finely-disintegrated cellulose may be 0.1 mmol/g or more and 5.0 mmol/g or less with reference to dry weight of cellulose.

A crystal structure of the finely-disintegrated cellulose may be cellulose type I.

The finely-disintegrated cellulose may have a fibrous form derived from a microfibril structure of native cellulose.

The finely-disintegrated cellulose may have a number average minor axis diameter of 1 nm or more and 100 nm or less, and a number average major axis diameter of 50 nm or more. The number average major axis diameter may be 10 times or more longer than the number average minor axis diameter.

The dispersion liquid may have a maximum value of absorbance in a range of a wavelength of 400 nm and more and 1500 nm or less.

A method for producing the dispersion liquid of the fifth aspect according to a sixth aspect of the present invention includes dispersing a finely-disintegrated cellulose fiber in a solvent to obtain finely-disintegrated cellulose dispersion liquid, mixing the finely-disintegrated cellulose dispersion liquid and a solvent containing metal ions with each other to obtain a mixed solution, and reducing the metal ions in the mixed solution to obtain a complex of the plate-like metal fine particle and the finely-disintegrated cellulose.

The metal ions may be silver ions.

When the finely-disintegrated cellulose is prepared, a carboxyl group may be introduced to a crystal surface of the finely-disintegrated cellulose.

When the carboxyl group is introduced, an oxidation reaction using an N-oxyl compound may be used.

When the carboxyl group is introduced, the carboxyl group may be introduced so as to be 0.1 mmol/g or more and 5.0 mmol/g or less with reference to dry weight of cellulose.

Advantageous Effects of the Invention

The complex according to the above aspect of the present invention has a configuration in which at least part or the whole of each piece of the finely-disintegrated cellulose is incorporated into the flat plate-like metal fine particle, and a remaining part is exposed from a surface of the flat plate-like metal fine particle. Thus, the complex of the flat plate-like metal fine particle and the finely-disintegrated cellulose is new and is applicable to optical materials such as a functional color material and a near-infrared-absorbing material.

The method for producing a complex according to the above aspect of the present invention has a step of reducing the metal ions in the mixed solution to grow the flat plate-like metal fine particle, and combining the flat plate-like metal fine particle and the finely-disintegrated cellulose with each other. Hence, the above complex can be provided by a simple method with a low environmental load.

In the dispersion liquid according to the above aspect of the present invention, the above complex is dispersed in water or an organic solvent. Thus, the flocculation is inhibited by steric hindrance or electrostatic repulsion between pieces of finely-disintegrated cellulose, which provides good dispersion stability.

Since the optical material according to the above aspect of the present invention includes the complex having a maximum value of the absorbance with respect to a given wavelength between 400 nm and 1500 nm, the optical material is useful as a functional color material and a near-infrared-absorbing material.

By using the above aspect of the present invention, a dispersion liquid containing a complex of a flat plate-like metal fine particle and finely-disintegrated cellulose, which has not been reported, can be obtained. Since the dispersion liquid selectively absorbs light having a given wavelength ranging from visible light to near-infrared light, the dispersion liquid can be utilized as a composition for forming a new optical material. In addition, since the flat plate-like metal fine particle contained in the dispersion liquid is bonded to finely-disintegrated cellulose, a good dispersed state can be kept on a long-term basis.

DESCRIPTION OF REPRESENTATIVE EMBODIMENTS

Hereinafter, a complex, which is an embodiment to which the present invention is applied, will be described in detail in addition to a method for producing the complex, and a dispersion liquid and an optical material containing the complex, with reference to the drawings. However, it should be noted that the invention is not necessarily limited to the representative embodiment described below.

Note that, in some of the drawings used in the following description, characterizing portions are enlarged for the sake of convenience so that the characteristics can be easily understood, and the proportion of dimensions of components and the like are not necessarily the same as those of actual ones.

<Complex>

First, a complex according to an embodiment of the present invention and a complex contained in a dispersion liquid will be described.

Figure 1:
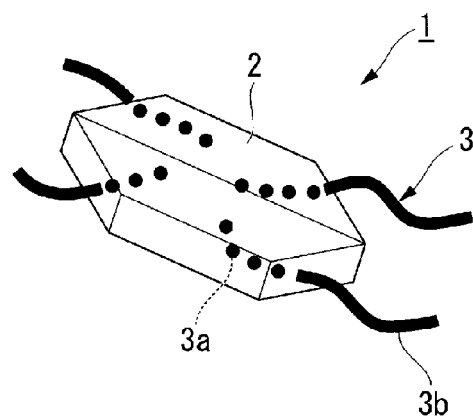
FIG. 1 is a perspective view schematically showing a configuration of a complex according to an embodiment of the present invention.

FIG. 1 is a perspective view schematically showing a configuration of a complex (contained in a dispersion liquid) 1 according to an embodiment of the present invention. As shown in FIG. 1, the complex 1 is a complex of a flat plate-like metal fine particle and finely-disintegrated cellulose. In the complex 1, a metal fine particle having a flat-plate shape (flat plate-like metal fine particle) 2 and at least one piece of finely-disintegrated cellulose 3 are combined. In the complex 1, at least part (a portion) of or the whole of each piece of the finely-disintegrated cellulose 3 is incorporated into the flat plate-like metal fine particle 2, and the remaining parts are exposed from the surfaces of the flat plate-like metal fine particle 2.

More specifically, as shown in FIG. 1, each piece of finely-disintegrated cellulose 3 is formed of a portion 3a incorporated into the flat plate-like metal fine particle 2 and a portion 3b exposed from the surface of the flat plate-like metal fine particle 2. In addition, due to the presence of the incorporated portion 3a, the flat plate-like metal fine particle 2 and each piece of finely-disintegrated cellulose 3 are in an inseparable state. That is, in the flat plate-like metal fine particle 2 and the finely-disintegrated cellulose 3, at least part of the finely-disintegrated cellulose 3 (i.e. the portion 3a) is incorporated into the flat plate-like metal fine particle 2. Thus, at least parts of these elements are physically connected with each other, thereby creating in an inseparable state.

In describing the complex 1, the wording "at least part of the finely-disintegrated cellulose 3 (i.e. the portion 3a) is incorporated into the flat plate-like metal fine particle 2" is synonymous with a state where, in a growth stage of the flat plate-like metal fine particle 2, the finely-disintegrated cellulose is incorporated into a metal fine particle unit so as to extend along a grain boundary thereof.

In addition, in the "inseparable" state, the flat plate-like metal fine particle 2 and the finely-disintegrated cellulose 3 cannot be separated from each other by a physical method of, for example, using a centrifuge or the like.

Note that the complex 1 having the following configuration is included in the scope of rights as long as the presence of the incorporated portion 3a can be recognized. In the configuration, all the portions (the whole) of the whole finely-disintegrated cellulose 3 configuring the complex 1 are incorporated into the flat plate-like metal fine particle 2, and no portions of the finely-disintegrated cellulose 3 are exposed from the surfaces of the flat plate-like metal fine particle 2.

Silver is preferable as a metal species forming the flat plate-like metal fine particle 2. However, the metal species is not specifically limited to silver. Specifically, two or more metal species may be used. Metal species other than silver are not specifically limited. The metal species to be used include, in addition to silver, for example, platinum group elements that are platinum, palladium, ruthenium, iridium, rhodium, and osmium. Other metal species include metals such as gold, iron, lead, copper, chromium, cobalt, nickel, manganese, vanadium, molybdenum, gallium, and aluminum, metal salts, metal complexes, and alloys, or oxides and multiple oxides of these, and the like.

Note that, in the present embodiment, the "flat plate-like" particle refers to a plate-like shape of a triangle, hexagon, pentagon or the like, and has an average aspect ratio (particle size/particle thickness) of 2.0 or more obtained by dividing a particle size by a particle thickness.

The particle size of the flat plate-like metal fine particle 2 is preferably 20 to 500 nm, and more preferably 20 to 400 nm.

The particle thickness of the flat plate-like metal fine particle 2 is preferably 5 to 100 nm, and more preferably 8 to 50 nm.

The average aspect ratio (particle size/particle thickness) is preferably 2.0 or more, more preferably 2.0 to 100, and further preferably 2.0 to 50.

Here, methods for measuring the particle size and the thickness of the flat plate-like metal fine particle and methods for calculating the aspect ratio specifically include, for example, the following methods.

(1) Method for Measuring a Particle Size

After a dispersion liquid containing a complex is cast on a copper grid having a supporting film for TEM observation and is subject to air-dried, transmission electron microscope observation is carried out. The diameter obtained by approximating the flat plate-like silver nanoparticle in an obtained image by a circle is calculated as a particle size in the planar direction.

(2) Method for Measuring a Thickness

After a dispersion liquid containing a complex is cast on a PET film, air-dried, and fixed by an embedding resin to obtain a lump pf resin, the obtained mass is cut in a cross-sectional direction by a microtome. Then transmission electron microscope observation is carried out. The thickness of the flat plate-like silver nanoparticle in the obtained image is calculated as a particle thickness.

(3) Method for Calculating an Aspect Ratio

When the particle size obtained as described above is defined as a, and the particle thickness obtained as described above is defined as b, the particle size a is divided by the particle thickness b to calculate an aspect ratio=a/b.

Note that the measuring method and the calculating method described above are examples and are not specifically limited.

The finely-disintegrated cellulose 3 preferably has a fiber form derived from a microfibril structure. Specifically, the finely-disintegrated cellulose 3 preferably has a number average minor axis diameter of 1 nm or more and 100 nm or less, and a number average major axis diameter of 50 nm or more. The number average major axis diameter is preferably 10 times or more longer than the number average minor axis diameter. In addition, the crystal structure of the finely-disintegrated cellulose 3 is preferably cellulose type I.

In addition, in the complex 1, the crystal surface of the finely-disintegrated cellulose 3 has carboxyl groups. The content of the carboxyl groups is preferably in the range of 0.1 mmol or more to 5.0 mmol or less per 1 g of cellulose.

As described above, the complex 1 is a complex of the flat plate-like metal fine particle 2 composed of one or more types of metals or a compound thereof and the finely-disintegrated cellulose fibers 3. In addition, in the complex 1, the flat plate-like metal fine particle 2 and the finely-disintegrated cellulose fibers 3 are physically bonded to each other and in an inseparable state. Furthermore, the complex 1 is a carbon-neutral organic-inorganic hybrid material.

<Method for Producing a Complex>

Next, a method for producing the complex 1 according to the embodiment described above will be described. In the method for producing the complex 1, metal is reduced and precipitated in a dispersion liquid containing finely-disintegrated cellulose and metal ions to generate a metal crystal, and the metal crystal is anisotropically grown, to obtain a complex of the flat plate-like metal fine particle and finely-disintegrated cellulose.

Hereinafter, the method for producing the complex according to the present embodiment will be schematically described. First, finely-disintegrated cellulose is prepared (first step). Next, the finely-disintegrated cellulose is dispersed in a solvent to obtain a finely-disintegrated cellulose dispersion liquid (second step). Next, the finely-disintegrated cellulose dispersion liquid and a solvent containing metal ions are mixed with each other to obtain a mixed solution (third step). Furthermore, the metal ions in the mixed solution are reduced to grow the flat plate-like metal fine particles, and the flat plate-like metal fine particle and the finely-disintegrated cellulose are mixed (fourth step). Hereinafter, each of the steps will be described in detail.

(First Step)

First, in the first step, finely-disintegrated cellulose forming the complex of the present embodiment is prepared. The first step includes a step of preparing fibrous finely-disintegrated cellulose and a step of introducing carboxyl groups to the crystal surface of the finely-disintegrated cellulose.

[Step of Preparing Fibrous Finely-Disintegrated Cellulose]

The finely-disintegrated cellulose used in the method of producing a complex according to the present embodiment only needs to have a structure with at least a side thereof being of a nanometer order. The method of preparing the fibrous finely-disintegrated cellulose is not specifically limited. Typically, the finely-disintegrated cellulose has a fiber form derived from a microfibril structure. Hence, as the finely-disintegrated cellulose used in the production method of the present embodiment, the following finely-disintegrated cellulose is preferable. That is, the shape of the finely-disintegrated cellulose is preferably fibrous, for example, as derived from a microfibril structure. In addition, the fibrous finely-disintegrated cellulose may have a number average minor axis diameter of 1 nm or more and 100 nm or less, and preferably 2 nm or more and 50 nm or less. Note that if the number average minor axis diameter is less than 1 nm, the finely-disintegrated cellulose cannot have a rigid structure having high crystallinity, whereby the anisotropic growth of the metal fine particle cannot be sufficiently advanced. In contrast, if the number average minor axis diameter is more than 100 nm, since the finely-disintegrated cellulose is excessively large in size relative to the metal fine particle, and hence, a complex of flat plate-like metal fine particle and the finely-disintegrated cellulose cannot be formed.

In addition, although the number average major axis diameter is not specifically limited, it may be preferably 10 times or more longer than the number average minor axis diameter. More preferably, the number average major axis diameter may be 50 nm or more, and may be 10 times or more longer than the number average minor axis diameter. A number average major axis diameter that is not 10 times or more longer than the number average minor axis diameter is not preferable because the anisotropic growth of the metal fine particle cannot be sufficiently advanced.

The number average minor axis diameter of the finely-disintegrated cellulose fiber is obtained by measuring minor axis diameters (minimum diameters) of 100 fibers by carrying out transmission electron microscope observation and atomic force microscope observation, and calculating an average value of the minor axis diameters.

Meanwhile, the number average major axis diameter of the finely-disintegrated cellulose fiber is obtained by measuring major axis diameters (maximum diameters) of 100 fibers by carrying out transmission electron microscope observation and atomic force microscope observation, and calculating an average value of the major axis diameters.

The type and the crystal structure of cellulose are not particularly limited which can be used as a raw material of the finely-disintegrated cellulose fiber. Specifically, as a raw material composed of cellulose I type crystals, for example, in addition to wood-based native cellulose, non-wood-based native cellulose can be used such as cotton linters, bamboo, hemp, bagasse, kenaf, bacterial cellulose, tunicate cellulose, and valonia cellulose. Furthermore, regenerated cellulose represented by a rayon fiber and a cuprammonium rayon fiber composed of cellulose II type crystals can also be used. In view of ease of the acquisition of the material, wood-based native cellulose is preferably used as the raw material.

The method for finely-disintegrating cellulose is not also specifically limited. However, in addition to the machine processing using a grinder and chemical treatments such as the TEMPO oxidation treatment described above, a dilute acid hydrolysis treatment, an enzyme treatment, and the like may be used. In addition, bacterial cellulose can also be used as the finely-disintegrated cellulose fiber. Furthermore, fine regenerated cellulose fibers may be used which can be obtained by dissolving various kinds of native cellulose in various cellulose solvents and thereafter the solution undergoing electrospinning.

When various kinds of cellulose are finely disintegrated by repeated processing using a grinder or the like, according to a method for finely-disintegrating cellulose, for example, the method disclosed in Patent Literature 1 described above, combining the obtained CNF and metal can obtain a complex of the metal and finely-disintegrated cellulose while controlling the shape of the metal nanoparticle. However, the fiber width of the finely-disintegrated cellulose fiber finely disintegrated by the grinder or the like has a distribution of 10 to 50 nm. Hence, the finely-disintegrated cellulose fiber is somewhat unsuitable to obtain a uniform complex of a flat plate-like metal fine particle and finely-disintegrated cellulose (and a dispersion liquid containing the complexes of a flat plate-like metal fine particle and finely-disintegrated cellulose) with good reproducibility. In addition, since the fiber width is large, transparency of the dispersion liquid and a formed body using the dispersion liquid lowers. When the dispersion liquid and the formed body are handled as an optical material and a composition for forming the optical material, such as a functional color material and a near-infrared-absorbing material, the use thereof may be limited.

When various kinds of cellulose are finely disintegrated by undergoing TEMPO-catalyzed oxidation according to the method disclosed in Patent Literature 4 described above, and the obtained CSNF and a metal are mixed, a dispersion liquid and a formed body using the dispersion liquid can also achieve high transparency because the minor axis diameter of the CSNF is about 3 nm, that is, extremely small just like a carbon nanotube. In this case, for example, the dispersion liquid and the formed body can be suitably used as an optical element such as a near-infrared absorbing film. In addition, the CSNF prepared by TEMPO oxidation achieves more homogeneous anisotropic growth of the metal fine particle than that achieved by the CNF and with good reproducibility. It can be inferred that this is because, although the detailed mechanism is unclear, the CSNF has a constant minor axis diameter of approximately 3 nm, contains carboxyl groups interacting with metal ions, and has a structure in which the carboxyl groups are fixed to the surface of the CSNF crystal at regular intervals. That is, in the production method of the present embodiment, both of CNF and CSNF can be used as the finely-disintegrated cellulose fiber. Meanwhile, from the viewpoints of transparency and an ability to control the shape described above, the finely-disintegrated cellulose used in the present embodiment is preferably a finely-disintegrated cellulose fiber having a crystal surface to which carboxyl groups are incorporated. From the viewpoints of cost and supply, the CSNF obtained by TEMPO oxidation of wood is more preferable.

Hereinafter, a method of producing a CSNF derived from wood will be described.

CSNF derived from wood and used in the present embodiment can be obtained by a step of oxidizing cellulose derived from wood and a step of finely disintegrating the cellulose to obtain a dispersion. In addition, the content of carboxyl groups introduced to the CSNF is preferably 0.1 mmol/g or more and 5.0 mmol/g or less, and is more preferably 0.5 mmol/g or more and 2.0 mmol/g or less. Note that if the amount of carboxyl groups is less than 0.1 mmol/g, electrostatic repulsion is not caused between the cellulose microfibrils. Hence, it is difficult to finely disintegrate and uniformly disperse the cellulose. In addition, if the content of carboxyl groups exceeds 5.0 mmol/g, the cellulose microfibril is formed into low molecules due to a side reaction accompanying chemical treatment. Hence, a rigid finely-disintegrated cellulose fiber structure having high crystallinity cannot be obtained, whereby anisotropic growth of the metal fine particle cannot be sufficiently advanced.

[Step of Introducing Carboxyl Groups to Cellulose]

Materials that can be used as wood-based native cellulose include, but are not specifically limited to, materials typically used for producing cellulose nanofibers, such as softwood pulp, hardwood pulp, and waste paper pulp. Softwood pulp or hardwood pulp is preferable because it is easily purified and finely disintegrated.

The method for introducing carboxyl groups to the surface of a fiber of cellulose derived from wood is not specifically limited. Specifically, for example, the cellulose may be allowed to react with monochloroacetic acid or sodium monochloroacetate in a high-concentration alkaline aqueous solution so as to be converted to carboxymethyl. Alternatively, the cellulose may be allowed to directly react with a carboxylic acid anhydride-based compound such as maleic acid, phthalic acid, or the like gasified in an autoclave to introduce carboxyl groups. Alternatively, a process may be used which uses a co-oxidant in the presence of an N-oxyl compound such as TEMPO, which has high selectivity with respect to the oxidation of alcoholic primary carbon, while the crystal structure of the cellulose is retained as much as possible under a relatively mild condition of a water system. The TEMPO oxidation reaction is more preferable from the viewpoints of selectivity for a portion to which carboxyl groups are introduced and the environmental load.

The N-oxyl compound includes TEMPO (2,2,6,6-tetramethylpiperidine-1-oxy radical), 2,2,6,6-tetramethyl-4-hydroxypiperidine-1-oxyl, 4-methoxy-2,2,6,6-tetramethylpiperidine-N-oxyl, 4-ethoxy-2,2,6,6-tetramethylpiperidine-N-oxyl, 4-acetamide-2,2,6,6-tetramethylpiperidine-N-oxyl, and the like. Among them, TEMPO is preferable. The amount of the N-oxyl compound to be used may be an amount used as a catalyst, and is not specifically limited but is typically approximately 0.01 to 5.0% by mass with respect to the solid content of the wood-based native cellulose subject to the oxidation treatment.

The oxidation method using an N-oxyl compound includes a method of dispersing wood-based native cellulose in water, and oxidizing the cellulose in the presence of the N-oxyl compound. In this method, a co-oxidant is preferably used together with the N-oxyl compound. In this case, in the reaction system, the N-oxyl compound is gradually oxidized by the co-oxidant to generate an oxammonium salt, by which the cellulose is oxidized. According to this oxidation treatment, the oxidation reaction proceeds smoothly even under mild conditions, whereby the efficiency of introducing carboxyl groups improves. When the oxidation treatment is carried out under mild conditions, the crystal structure of the cellulose can be easily maintained.

As the co-oxidant, if the oxidation reaction can be accelerated, any oxidant can be used such as halogen, hypohalous acid, halous acid, perhalogen acid, salt of them, halogen oxide, nitrogen oxide, and peroxide. From viewpoints of availability and reactivity, sodium hypochlorite is preferable. The amount of the co-oxidant to be used is not specifically limited if the oxidation reaction can be accelerated. Typically, the amount is approximately 1 to 200% by mass with respect to the solid content of the wood-based native cellulose subject to the oxidation treatment.

In addition, together with the N-oxyl compound and the co-oxidant, at least one type of compound may be used in combination which is selected from a group consisting of bromide and iodide. Hence, the oxidation reaction can proceed smoothly, whereby the efficiency of introducing carboxyl groups can be improved. As such a compound, sodium bromide or lithium bromide is preferable, and sodium bromide is more preferable from the viewpoints of cost and stability. The amount of the compound to be used is not specifically limited if the oxidation reaction can be accelerated. Typically, the amount is approximately 1 to 50% by mass with respect to the solid content of the wood-based native cellulose subject to the oxidation treatment.

Reaction temperature of the oxidation reaction is preferably in the range of 4° C. or more to 80° C. or less, and is more preferably in the range of 10° C. or more to 70° C. or less. If the reaction temperature is less than 4° C., reactivity of a reagent lowers, thereby lengthening the reaction time. If the reaction temperature is more than 80° C., side reactions accelerate, whereby the sample is formed into low molecules. Thereby, the rigid finely-disintegrated cellulose fiber structure having high crystallinity collapses, whereby anisotropic growth of the metal fine particle cannot be sufficiently advanced.

In addition, the reaction time of the oxidation treatment can be appropriately set in consideration of reaction temperature, the desired amount of carboxyl groups, and the like. The reaction time is not specifically limited, but is typically about 10 minutes to 5 hours.

It is preferable that the pH of the reaction system during the oxidation reaction is 9 or more and 11 or less. The reaction can be efficiently accelerated if pH is 9 or more. If pH is more than 11, side reactions accelerate, which may accelerate decomposition of the sample. In addition, in the oxidation treatment, as oxidation proceeds, the pH in the system lowers due to the generation of carboxyl groups. Hence, it is preferable that, during the oxidation treatment, the pH of the reaction system is kept at 9 or more and 11 or less. The method for keeping the pH of the reaction system at 9 or more and 11 or less includes a method of adding an alkaline aqueous solution depending on the lowering of pH.

The alkaline aqueous solution may be sodium hydroxide aqueous solution, lithium hydroxide aqueous solution, potassium hydroxide aqueous solution, or ammonia aqueous solution, or organic alkali such as tetramethylammonium hydroxide aqueous solution, tetraethyl ammonium hydroxide aqueous solution, tetrabutylammonium hydroxide aqueous solution, and benzyl trimethyl ammonium hydroxide aqueous solution. Sodium hydroxide aqueous solution is preferable from viewpoints of cost and the like.

The oxidation reaction using an N-oxyl compound can be stopped by adding alcohol to the reaction system. In this case, pH of the reaction system is preferably kept within the above range. As the alcohol to be added, a low-molecular-weight alcohol such as methanol, ethanol, and propanol is preferable because the reaction is quickly ended. Ethanol is especially preferable from a viewpoint of safety of a secondary product generated by the reaction.

The reaction solution obtained after the oxidation reaction may be provided to a finely-disintegrating step without change. However, it is preferable that oxidized cellulose contained in the reaction solution is retrieved and is cleaned with a cleaning liquid to remove a catalyst such as an N-oxyl compound, impurities, and the like. The oxidized cellulose can be retrieved by a known method such as filtration using a glass filter or a nylon mesh having a pore diameter of 20 The cleaning liquid used for cleansing the oxidized cellulose is preferably pure water.

(Second Step)

Next, in the second step, the finely-disintegrated cellulose prepared in the above first step is dispersed in a solvent to obtain a finely-disintegrated cellulose dispersion liquid.

In the method for preparing the finely-disintegrated cellulose dispersion liquid, first, an aqueous medium is added to cellulose so as to suspend it (cellulose dispersion step). As the aqueous medium, the mediums described above may be used, and water is especially preferable. If necessary, pH of the suspension may be controlled to increase dispersibility of the cellulose and the CSNF to be generated. As an alkaline aqueous solution used for the pH control, an alkaline aqueous solution similar to that cited in the description regarding the oxidation treatment may be used. Next, the suspension is subject to a physical defibrating treatment to finely disintegrate the cellulose. The physical defibrating treatment may be a mechanical treatment using a high-pressure homogenizer, an ultrahigh-pressure homogenizer, a ball mill, a roll mill, a cutter mill, a planetary mill, a jet mill, an attritor, a grinder, a blender, Homo Mixer, an ultrasonic homogenizer, Nanogenizer, or underwater counter collision. Application of the above physical defibrating treatment to, for example, the TEMPO oxidized cellulose finely disintegrates the cellulose in the suspension. Hence, a dispersion liquid of CSNFs having a fiber surface having carboxyl groups can be obtained. Depending on the time and the number of times carrying out the physical defibrating treatment, the number average minor axis diameter and the number average major axis diameter of the CSNF contained in the obtained CSNF dispersion liquid can be adjusted.

Accordingly, a CSNF dispersing element to which carboxyl groups are introduced can be obtained. The obtained dispersing element is subject to dilution, concentration, and the like without change. The resultant dispersing element can be used as a reaction field in which metal fine particles are precipitated by reduction.

Next, a step of preparing a dispersion liquid containing the complexes of the flat plate-like metal fine particle and the CSNFs will be described. Note that the present invention is not limited to the following example.

[Step of Producing a Dispersion Liquid Containing a Complex of a Flat Plate-Like Metal Fine Particle and Finely-Disintegrated Cellulose]

The flat plate-like silver nanoparticle can absorb light of given wavelength ranging from visible light to near infrared light, and can easily provide desired optical properties according to the use of various compositions. In addition, since silver is inactive with respect to a human body though silver has antibacterial activity with respect to various bacterial strains, a composition having good preservability and safety can be obtained. A plurality of metal species may be used as the metal species combined with the CSNF derived from wood. The metal species are not especially limited, but include, in addition to silver, for example, platinum group elements that are platinum, palladium, ruthenium, iridium, rhodium, and osmium, metals such as gold, iron, lead, copper, chrome, cobalt, nickel, manganese, vanadium, molybdenum, gallium, and aluminum, a metal salt, a metal complex, alloys of them, oxides and multiple oxides of them, and the like. In addition, since antibacterial activity can be provided by forming a complex with silver, corrosion resistance of the CSNF can also be improved. When a plurality of metal species is used, the surroundings of a precipitated silver nanoparticle may be covered with a metal nobler than silver or metal oxide such as silica to improve stability of the silver nanoparticle. The method for producing a complex by precipitating metal fine particles in the CSNF dispersion liquid is not specifically limited. However, the metal fine particles can be easily precipitated by mixing the CSNF dispersion liquid with a solution of metal (metal ion-containing solution) such as silver, alloy, oxide, multiple oxide, or the like (mixing step), and adding a reducing agent to the mixture (reduction step). In the case of silver, although the type of the aqueous solution containing silver ions and used for reduction is not specifically limited, a silver nitrate aqueous solution is preferable from viewpoints of availability and easiness to handle. The reducing agent to be used is also not specifically limited. For example, ascorbic acid, citric acid, hydroquinone, sodium borohydride, sodium cyanoborohydride, dimethylamine borane, hydrazine, or the like is used. From viewpoints of safety and cost, ascorbic acid, citric acid, and sodium borohydride are preferable.

The solvent used for dispersing CSNFs derived from wood contains 50% or more of water. As the solvent other than water, a hydrophilic solvent is preferable. If the proportion of the water in the solvent is 50% or less, the dispersion of the CSNFs derived from wood is inhibited, and it becomes difficult to form a uniform complex of a metal fine particle and CSNFs derived from wood. Although the hydrophilic solvent is not specifically limited, alcohols such as methanol, ethanol, and isopropanol, cyclic ethers such as tetrahydrofuran, and the like are preferable. If necessary, pH of the suspension may be controlled to increase dispersibility of cellulose and the CSNF to be generated. As an alkaline aqueous solution used for the pH control, the alkaline aqueous solution similar to that described above may be used.

The concentration in the dispersion liquid of CSNFs used for preparation is not specifically limited, but is preferably 0.1% or more and less than 20%. If less than 0.1%, the dispersion liquid as a composition for forming a formed object becomes a state where the solvent content is excessive, and the particle diameter of the metal nanoparticle is not sufficiently controlled with effect. If 20% or more, the viscosity sharply increases due to the entanglement of the finely-disintegrated cellulose fibers, whereby uniform stirring becomes difficult to conduct. The metal ion concentration of the solution containing metal ions is also not limited. However, it is preferable that the preparation is conducted so that the amount of metal ions in the dispersion liquid becomes less than the amount of carboxyl groups present on the surface of the CSNF. This is because if the amount of metal ions in the dispersion liquid exceeds the amount of carboxyl groups present on the surface of the CSNF, the CSNFs are flocculated. Three conditions, that is, the CSNF concentration, the metal ion concentration, and the reducing agent concentration determine an aspect ratio of the flat plate-like metal fine particle. That is, setting these three conditions to proper values can appropriately produce a dispersion liquid having an absorption peak at an intended wavelength.

In addition, the dispersion liquid may contain, in addition to the flat plate-like metal fine particle/finely-disintegrated cellulose complex, spherical metal fine particles having a diameter of approximately several nm as secondary products. However, the spherical metal fine particles can be removed by a centrifuge. The spherical fine particle including at least silver and having a diameter of several nm is colored yellow because the spherical fine particle absorbs light having a wavelength of approximately 400 nm. However, if the spherical fine particles are removed, a dispersion liquid can be obtained which absorbs only a wavelength derived from a resonance peak of the flat plate-like metal fine particle/finely-disintegrated cellulose complex. In this case, if the aspect ratio of the flat plate-like metal fine particle/finely-disintegrated cellulose complex is made larger (e.g., the particle size of the complex is made two times or more larger than the thickness of the particle), the complex can be used as a near-infrared-absorbing material having a high visible light transmittance. The relationship between each of the CSNF concentration, the metal ion concentration, and the reducing agent concentration and the aspect ratio of the flat plate-like metal fine particle/CSNF cellulose complex has many unclear points in the theoretical mechanism. However, a specific method for preparing a composition for forming an optical material available for the flat plate-like metal fine particle/CSNF complex, the near-infrared-absorbing material, and the like is described in detail in the Examples.

Note that, in order to advance anisotropic growth of the metal fine particle to precipitate the flat plate-like metal fine particle/CSNF complex, the amount of silver used during the reduction and precipitation treatment is preferably within a range of 0.0005 mmol or more to 0.4 mmol or less with respect to 1 g of the CSNF, further preferably within a range of 0.001 mmol or more to 0.2 mmol or less, and particularly preferably 0.002 mmol or more and 0.1 mmol or less.

If necessary, the dispersion liquid may contain the flat plate-like metal fine particle/CSNF complex and additional components that are not used for preparing the complex, within a range not decreasing advantageous effects of the invention. The additional components are not specifically limited, and can be appropriately selected from known additives depending on the use of the dispersion liquid and the like. Specifically, the additional components include an organometallic compound such as alkoxysilane, hydrolysate thereof, an inorganic layered compound, an inorganic needle-like mineral, a defoaming agent, inorganic particles, organic particles, a lubricant agent, an antioxidant, an antistatic agent, an ultraviolet absorbing agent, a stabilizing agent, magnetic powder, an orientation accelerator, a plasticizing agent, a cross-linking agent, and the like.

The dispersion liquid obtained as described above is a dispersion liquid containing complexes of finely-disintegrated cellulose fibers and a flat plate-like fine particle formed of one or more types of metals including at least silver or compounds thereof. In addition, the dispersion liquid is characterized in that the flat plate-like fine particle and the finely-disintegrated cellulose fibers are physically bonded to each other and in an indivisible state, and contains a carbon-neutral new organic-inorganic hybrid material. Furthermore, the dispersion liquid has very good dispersion stability. In the dispersion liquid, the contained particles do not settle even when the particle size thereof is 100 nm or more. In addition, the dispersion liquid has a maximum value of the absorbance with respect to any wavelength between 400 nm and 1500 nm. Hence, the dispersion liquid can be industrially used as a coating fluid for forming various optical elements such as a near-infrared-absorbing material.

(Third Step)

Next, in the third step, the finely-disintegrated cellulose dispersion liquid obtained in the above second step and a solution containing metal ions are mixed to obtain a mixed solution.

Specifically, first, metal, an alloy, metal oxide, or metal multiple oxide is dissolved in a solvent such as water to prepare the solution (metal ion-containing solution) containing the metal ions. Next, while the finely-disintegrated cellulose dispersion liquid is stirred, the prepared metal ion-containing solution is added to the finely-disintegrated cellulose dispersion liquid little by little to obtain the mixed solution of the finely-disintegrated cellulose dispersion liquid and the metal ion-containing solution.

Meanwhile, the flat plate-like silver nanoparticle can absorb light of given wavelength ranging from visible light to near infrared light by controlling the shape thereof, and can easily provide desired optical properties according to the use of various compositions. In addition, since silver is inactive with respect to a human body though silver has antibacterial activity with respect to various bacterial strains, a composition having good preservability and safety can be obtained.

In the production method of the present embodiment, silver is preferable as metal species combined with CSNF derived from wood. However, the metal species are not specifically limited to silver. Specifically, two or more metal species may be combined with the CSNF. Other than silver, the metal species are not specifically limited. Available metal species include, for example, platinum group elements that are platinum, palladium, ruthenium, iridium, rhodium, and osmium. Other suitable metal species include metals such as gold, iron, lead, copper, chromium, cobalt, nickel, manganese, vanadium, molybdenum, gallium, and aluminum, metal salts, and metal complexes, in addition to alloys, oxides, and multiple oxides thereof. In addition, since antibacterial activity can be provided by forming a complex with silver, corrosion resistance of CSNF can also be improved. When a plurality of metal species is used, precipitated silver nanoparticles may be covered with a metal nobler than silver or metal oxide such as silica to improve stability of the silver nanoparticles.

(Fourth Step)

Next, in the fourth step, the metal ions in the mixed solution obtained in the third step described above are reduced to grow the flat plate-like metal fine particle, and the flat plate-like metal fine particle and the finely-disintegrated cellulose are combined.

The method for producing a complex by precipitating a metal fine particle in the CSNF dispersion liquid is not specifically limited. However, the metal fine particle can be easily precipitated by mixing the CSNF dispersion liquid with a solution of metal described above such as silver, alloy, oxide, or multiple oxide, and adding a reducing agent to the mixture.

For example, in the case of silver, although the type of the aqueous solution containing silver ions used for reduction is not specifically limited, a silver nitrate aqueous solution is preferable from viewpoints of availability and ease of handling. The reducing agent to be used is also not specifically limited. As the reducing agent for silver, for example, ascorbic acid, citric acid, hydroquinone, sodium borohydride, sodium cyanoborohydride, dimethylamine borane, hydrazine, or the like is used. From viewpoints of safety and cost, ascorbic acid, citric acid, or sodium borohydride is preferable.

Note that, in order to advance anisotropic growth of the metal fine particle to precipitate the complex of the flat plate-like metal fine particle and CSNF, the amount of silver used during the reduction and precipitation treatment is preferably within a range of 0.0005 mmol or more to 0.4 mmol or less, further preferably within a range of 0.001 mmol or more to 0.2 mmol or less, and particularly preferably within a range of 0.002 mmol or more to 0.1 mmol or less, with respect to 1 g of CSNF.

Figure 2:
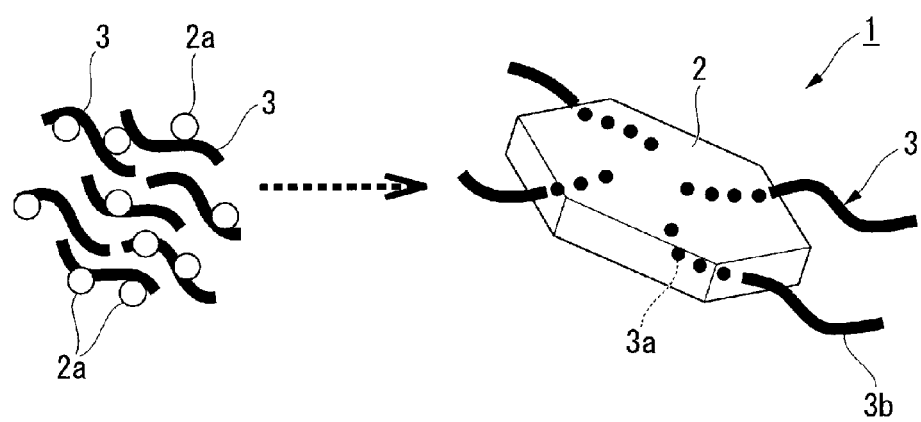
FIG. 2 is a schematic view for illustrating part of a process in a method for producing the complex according to the embodiment of the present invention.

FIG. 2 is a schematic view for illustrating part a process in a method for producing a complex according to an embodiment to which the present invention is applied.

In the fourth step of the production method of the present embodiment, first, a reducing agent is added to the mixed solution, whereby the precipitation of metal starts with the carboxyl group provided on the finely-disintegrated cellulose 3 as the starting point. Then, the precipitated metal forms primary particles (metal nanoparticles) 2a (refer to the left view in FIG. 2). When the reaction proceeds further, the primary particles 2a are flocculated with one another, whereby a metal fine particle having a flat-plate shape (i.e. flat plate-like metal fine particle) 2 is formed. In this case, a complex is formed, with the portion 3a of the CSNF (fiber of finely-disintegrated cellulose) 3 being incorporated into the metal fine particle 2, and the remaining portion 3b being exposed (refer to the right view in FIG. 2).

According to the above steps, the complex 1 of the flat plate-like metal fine particle 2 and the finely-disintegrated cellulose 3 of the present embodiment can be obtained.

In the method of producing a complex according to the present embodiment, in the second step described above, the concentration of the dispersion liquid of CSNF is not specifically limited, but is preferably 0.1% or more and less than 20%. If less than 0.1%, the dispersion liquid as a composition for forming a formed object becomes a state where the solvent is excessive. In addition, if 20% or more, the viscosity sharply increases due to the entanglement of the finely-disintegrated cellulose fibers, whereby uniform stirring becomes difficult carry out.

In addition, in the third step described above, the metal ion concentration of the solution containing metal ions is not specifically limited. However, it is preferable that the preparation is carried out so that the amount of metal ions in the dispersion liquid becomes less than the amount of carboxyl groups present on the surface of the CSNF. This is because if the amount of metal ions in the dispersion liquid exceeds the amount of carboxyl groups present on the surface of the CSNF, the CSNF is flocculated.

Furthermore, in the fourth step described above, the reducing agent concentration of the mixed solution is not specifically limited. However, it is preferable that the reducing agent concentration is adjusted so as to be equal to or more than the metal ion concentration. This is because if the reducing agent concentration of the mixed solution is the metal ion concentration or less, metal ions that have not been reduced remain in the mixed solution.

As described above, three conditions of the CSNF concentration, the metal ion concentration, and the reducing agent concentration determine the aspect ratio of the precipitated flat plate-like metal fine particle. That is, setting these three conditions to proper values can appropriately produce a complex of the flat plate-like metal fine particle and the finely-disintegrated cellulose, the complex having an absorption peak with respect to an intended wavelength. Note that, the aspect ratio of the flat plate-like metal fine particle tends to increase as the metal ion concentration decreases, and to decrease as the metal ion concentration increases.

Note that, in the method for producing the complex 1 of the present embodiment described above, the relationship between each of the CSNF concentration, the metal ion concentration, and the reducing agent concentration and the aspect ratio of the obtained complex of the flat plate-like metal fine particle and the CSNF has many unclear points in the theoretical mechanism. Specific methods for preparing the complex of the flat plate-like metal fine particle and the CSNF and an optical material available for a near-infrared-absorbing material or the like are described in detail in the Examples.

<Dispersion Liquid of the Complex>

Dispersing the complex of the flat plate-like metal fine particle and the finely-disintegrated cellulose of the present embodiment to water or an organic solvent can generate a dispersion liquid of the complex. As the organic solvent, materials described above can be used, and alcohols such as methanol, ethanol, and IPA are preferably used. In addition, a given additive component such as an alkaline aqueous solution used for pH control may be contained.

In addition, the reaction solution obtained after the fourth step in the method for producing a complex of the present embodiment described above may be a dispersion liquid without change.

In the dispersion liquid of the complex (complex dispersion liquid) of the present embodiment, the flocculation is inhibited by steric hindrance and electrostatic repulsion between pieces of finely-disintegrated cellulose. Hence, the complex in the dispersing medium does not settle easily, which provides good dispersion stability.

<Optical Element>

The complex of the flat plate-like metal fine particle and the finely-disintegrated cellulose according to the present embodiment and the complex dispersion liquid described above have a maximum value of the absorbance with respect to a given wavelength between 400 nm and 1500 nm. Hence, the complex and the complex dispersion liquid can be used as various optical elements such as a near-infrared-absorbing material.

Meanwhile, when the complex of the present embodiment is produced by the production method described above, the complex may include a spherical metal fine particle having a diameter of approximately several nm as a secondary product. However, the spherical metal fine particle can be removed by a centrifuge.

Note that a spherical fine particle, which includes at least silver and has a diameter of several nm, has a yellowish hue because it absorbs light with wavelengths of approximately 400 nm. However, by removing the spherical fine particle by the centrifuge described above or the like, the complex can be used as a new optical material that absorbs only a wavelength derived from a resonance peak of the complex of the flat plate-like metal fine particle and the finely-disintegrated cellulose.

In addition, the complex of the flat plate-like metal fine particle and the finely-disintegrated cellulose according to the present embodiment having a large aspect ratio can be used as a near-infrared-absorbing material having a high visible light transmittance.

As described above, the complex 1 of the present embodiment has a configuration in which at least part (3a) of each piece of the finely-disintegrated cellulose 3 is incorporated into the flat plate-like metal fine particle 2, and the remaining part (3b) of each piece of the finely-disintegrated cellulose 3 is exposed from the surfaces of the flat plate-like metal fine particle 2. Hence, the complex 1 of the flat plate-like metal fine particle 2 and the finely-disintegrated cellulose 3 can be provided, the complex being applicable to optical materials such as a functional color material and a near-infrared-absorbing material.

In addition, since the method for producing a complex according to the present embodiment has a step of reducing the metal ions in the mixed solution to grow the flat plate-like metal fine particle, while combining the flat plate-like metal fine particle and the finely-disintegrated cellulose, the complex can be provided easily with reduced environmental load.

According to the dispersion liquid of the complex of the present embodiment, since the flocculation is inhibited by steric hindrance and electrostatic repulsion between pieces of finely-disintegrated cellulose, the complex in the dispersing medium does not settle easily, which can provide the dispersion liquid having good dispersion stability. In addition, this dispersion liquid of the complex can also be used as an optical material.

Since the optical material according to the present embodiment includes a complex having a maximum value of the absorbance with respect to a given wavelength between 400 nm and 1500 nm, the optical material is useful as a functional color material and a near-infrared-absorbing material.

Note that the technical scope of the present invention is not limited to the above embodiment, and can be appropriately modified within a range not departing from the spirit of the present invention.

Hereinafter, the present invention will be described in detail based on Examples. However, the technical scope of the present invention is not limited to the Examples. In the following Examples, % indicates % by mass (w/w %) unless otherwise noted.

Example 1

TEMPO Oxidation of Wood Cellulose 70 g of softwood kraft pulp was suspended in 3500 g of distilled water, followed by adding a solution obtained by dissolving 0.7 g of TEMPO and 7 g of sodium bromide in 350 g of distilled water, and further followed by cooling to 20° C. To the resultant solution, 450 g of sodium hypochlorite aqueous solution with 2 mol/L and 1.15 g/mL density was added by dropping, whereby the oxidation reaction was started. The temperature in the system was kept constant at 20° C. The lowered pH during the reaction was kept at pH 10 by adding 0.5 N sodium hydroxide aqueous solution. With respect to the weight of cellulose, when the sum of the additive amount of sodium hydroxide reached 3.50 mmol/g, approximately 100 mL of ethanol was added to stop the reaction. Thereafter, filtering and washing were repeated with distilled water by means of a glass filter, whereby oxidized pulp was obtained.

(Measurement of the Amount of Carboxyl Groups of Oxidized Pulp)

The oxidized pulp obtained by TEMPO oxidation were measured to obtain solid content weight of 0.1 g of those pulps, followed by dispersing the measured solids in water so as to have a concentration of 1%, and further followed by adding hydrochloric acid so as to achieve pH of 2.5. Thereafter, the amount of carboxyl groups (mmol/g) was determined by conductometric titration using 0.5 M sodium hydroxide aqueous solution. The result was 1.6 mmol/g.

(Defibrating Treatment of Oxidized Pulp)

1 g of the oxidized pulp obtained by the TEMPO oxidation was dispersed in 99 g of distilled water, and was finely disintegrated for 30 minutes by a blender, to obtain a CSNF water dispersion liquid having a CSNF concentration of 1%. The number average minor axis diameter of CSNF contained in the CSNF water dispersion liquid was 4 nm, and the number average major axis diameter of the CSNF was 1110 nm. In addition, when steady viscoelasticity was measured by using a rheometer, the CSNF dispersion liquid exhibited thixotropic properties.

Preparation of a Silver Nitrate Aqueous Solution 50 mg of silver nitrate was dissolved in 10 mL of distilled water to prepare a silver nitrate aqueous solution.

Preparation of a Sodium Borohydride Aqueous Solution 50 mg of sodium borohydride was dissolved in 10 mL of distilled water to prepare a sodium borohydride aqueous solution.

Preparation of a Complex of a Flat Plate-Like Metal Fine Particle and Finely-Disintegrated Cellulose While 50 g of the 1% CSNF water dispersion liquid described above was stirred in the state where the temperature is kept constant (15° C.), 2.0 mL of the silver nitrate aqueous solution was added. After 5-minute stirring, 2 mL of the sodium borohydride aqueous solution was added. Furthermore, the resultant solution was stirred for 30 minutes to prepare a complex of the flat plate-like metal fine particle and the finely-disintegrated cellulose in the dispersion liquid.

Figure 3A:
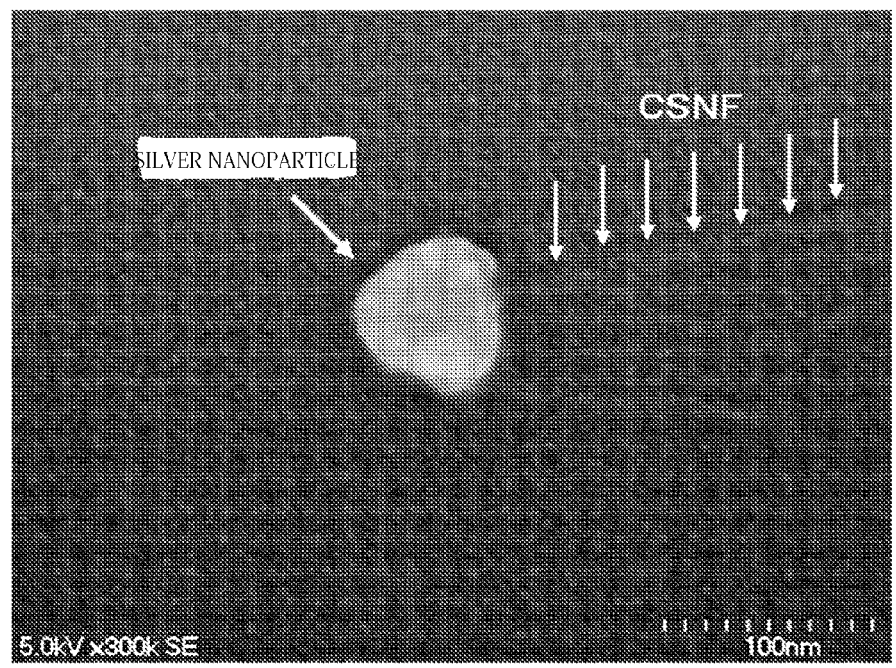
FIG. 3A shows an SEM image showing a result of observation of a complex, which is obtained in an Example 1, by means of a scanning electron microscope (SEM)
Figure 3B:
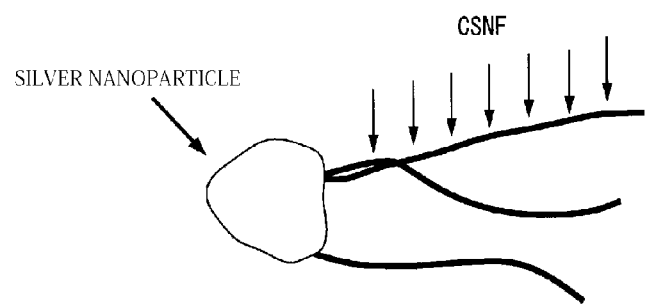
FIG. 3B shows a schematic view of the SEM image of FIG. 3A.

Observation of the Shape of the Complex of the Flat Plate-Like Metal Fine Particle and the Finely-Disintegrated Cellulose The obtained complexes of the flat plate-like metal fine particle and the finely-disintegrated cellulose in the dispersion liquid was refined and fractionated by using a high-speed refrigerated centrifuge under the condition of 75, 600 g (30 minutes×5 sets). The dispersion liquid containing the refined plate-like metal fine particles was cast on a silicon wafer plate and was subject to a platinum vapor deposition process. Thereafter, the obtained complex was observed from the vertical direction by using a scanning electron microscope (manufactured by Hitachi High-Technologies Corporation, "S-4800"). FIG. 3A shows the result of the observation of the obtained complex by the scanning electron microscope (SEM). In addition, FIG. 3B shows a schematic view of an SEM image obtained in FIG. 3A. The flat plate-like metal fine particle and CSNF were simultaneously observed to confirm a mutual bonding state between CSNF and the flat plate-like metal fine particle.

Figure 4:
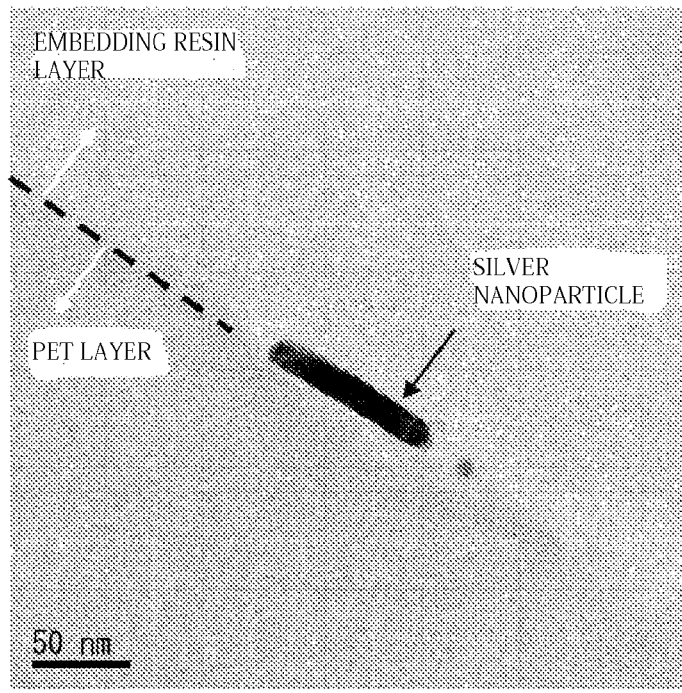
FIG. 4 shows a view (TEM image) showing a result of observation of the complex, which is obtained in the Example 1, from a cross-sectional direction by means of a transmission electron microscope (TEM).

The dispersion liquid containing the complex of the refined plate-like metal fine particle and the finely-disintegrated cellulose was casted on a PET film and was observed from the cross-sectional direction by using a transmission electron microscope (manufactured by JEOL Ltd., "JEM2100F"). FIG. 4 shows the result of observation from the cross-sectional direction by the transmission electron microscope (TEM). Note that the particle thickness of the plate-like metal fine particle was calculated from the obtained TEM image.

Figure 9:
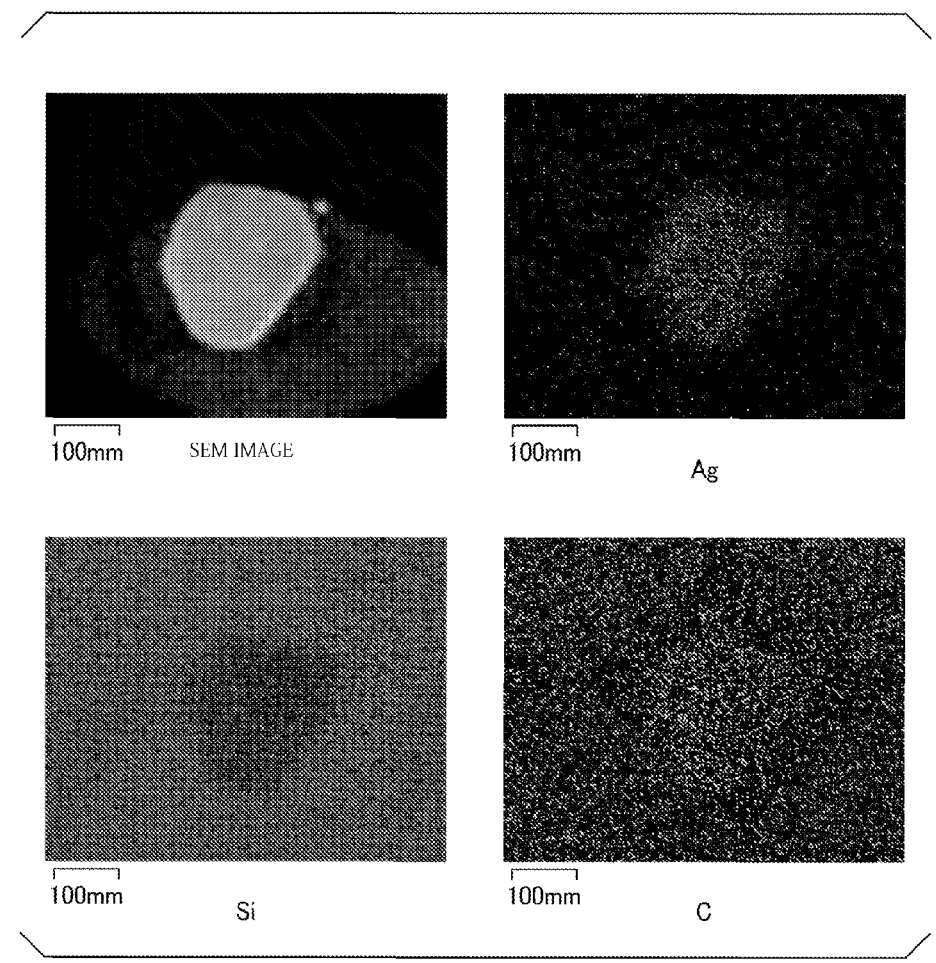
FIG. 9 shows element mapping images (photographs) of the complex of the flat plate-like metal fine particle and CSNFs, which is prepared in Example 1, by means of SEM-EDX.

The dispersion liquid containing the complex of the refined flat plate-like metal fine particle and the finely-disintegrated cellulose was casted on a silicon wafer plate, and was subject to SEM observation in a non-vapor deposition state. Thereafter, elemental mapping was carried out using energy dispersive X-ray spectrometry. The result is shown in FIG. 9.

Figure 5A:
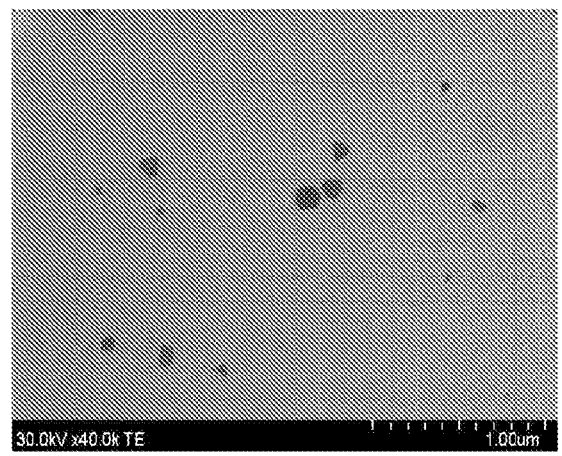
FIG. 5A shows an STEM image showing an observation result of the complex, which is obtained in the Example 1, by means of a scanning transmission electron microscope (STEM)
Figure 5B:
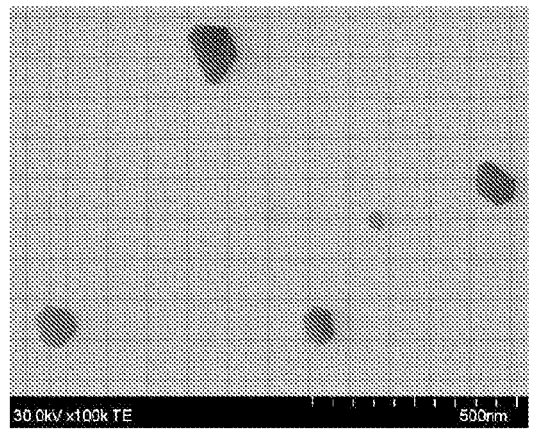
FIG. 5B shows an enlarged view of FIG. 5A.

The complex of the flat plate-like metal fine particle and the finely-disintegrated cellulose was observed by using a scanning transmission electron microscope (manufactured by Hitachi High-Technologies Corporation, "S-4800"). FIG. 5A and FIG. 5B show an observation result of the obtained complex by the scanning transmission electron microscope (STEM). Note that FIG. 5B shows an enlarged view of FIG. 5A. The diameter obtained by approximating the flat plate-like silver nanoparticle in the obtained image by a circle was calculated as a particle size in the planar direction.

Spectral Absorption Spectrum Measurement of the Complex of the Flat Plate-Like Metal Fine Particle and the Finely-Disintegrated Cellulose A water dispersion liquid of the complexes of the flat plate-like metal fine particle and the finely-disintegrated cellulose was injected in a quartz cell to measure the spectrum by using a spectral photometer (manufactured by Shimadzu Corporation, "UV-3600").

Figure 6:
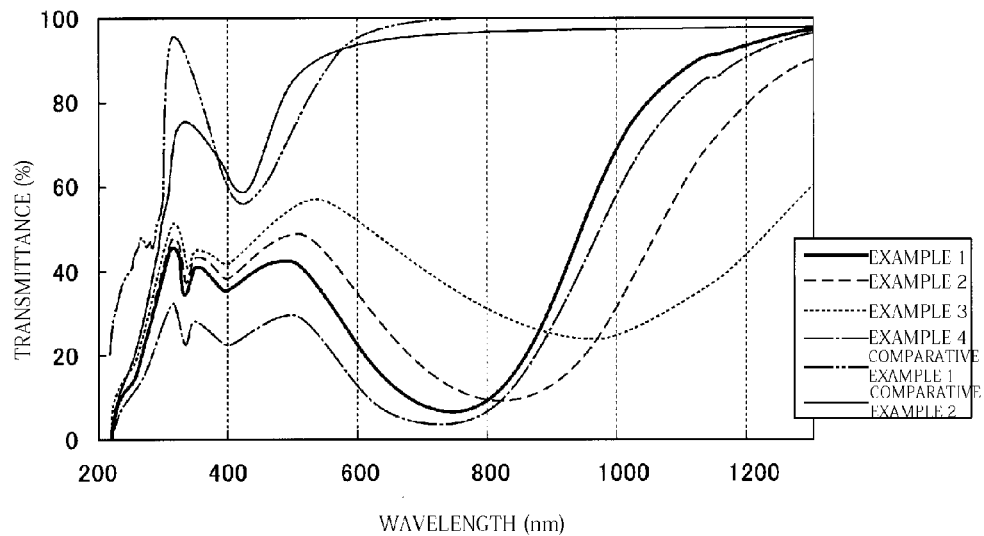
FIG. 6 is a diagram illustrating spectral transmission spectra of complexes of a flat plate-like metal fine particle and CSNFs prepared in Examples 1 to 4 and Comparative Examples 1 to 2.

The results are shown in Table 1 and FIG. 6.

Example 2

Figure 5C:
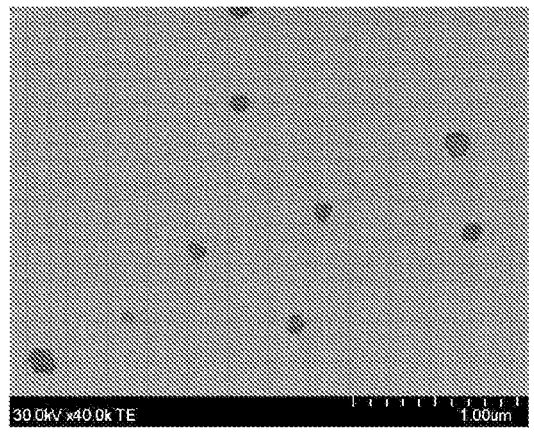
FIG. 5C shows an STEM image showing an observation result of a complex, which is obtained in an Example 2, by means of the scanning transmission electron microscope (STEM).
Figure 5D:
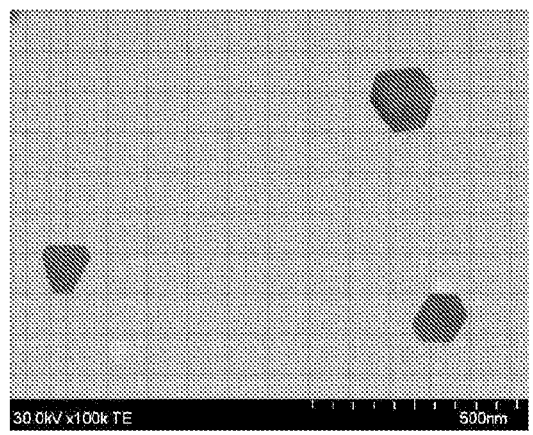
FIG. 5D shows an enlarged view of FIG. 5C.

A dispersion liquid containing a flat plate-like silver/finely-disintegrated cellulose complex was prepared under conditions similar to those of the Example 1 except that the additive amount of the silver nitrate aqueous solution was 1.0 mL. Then, electron microscope observation and spectral absorption spectrum measurement of the obtained flat plate-like silver/finely-disintegrated cellulose complex were carried out through methods similar to those of the Example 1. The results are shown in Table 1, FIG. 5C, FIG. 5D, and FIG. 6. Note that FIG. 5D shows an enlarged view of FIG. 5C.

Example 3

Figure 5E:
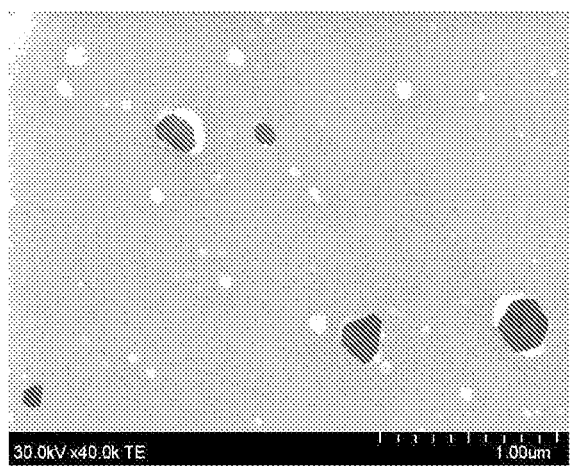
FIG. 5E shows an STEM image showing an observation result of a complex, which is obtained in an Example 3, by means of the scanning transmission electron microscope (STEM).
Figure 5F:
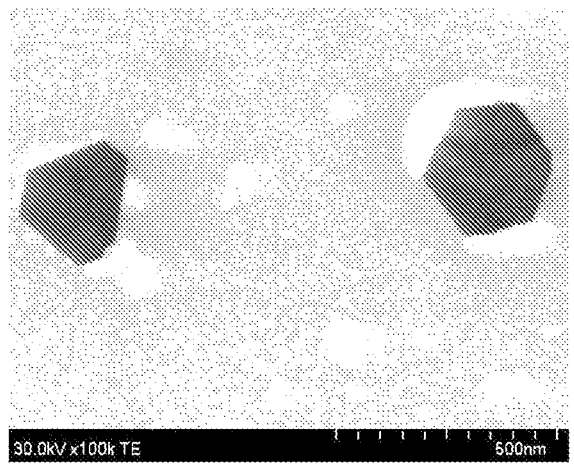
FIG. 5F shows an enlarged view of FIG. 5E.

A dispersion liquid containing a flat plate-like silver/finely-disintegrated cellulose complex was prepared under conditions similar to those of the Example 1 except that the additive amount of the silver nitrate aqueous solution was 0.5 mL. Then, electron microscope observation and spectral absorption spectrum measurement of the obtained flat plate-like silver/finely-disintegrated cellulose complex were carried out through methods similar to those of the example 1. The results are shown in Table 1, FIG. 5E, FIG. 5F, and FIG. 6. Note that FIG. 5F shows an enlarged view of FIG. 5E.

Example 4

A flat plate-like silver/finely-disintegrated cellulose complex was prepared under conditions similar to those of the Example 1 except that the concentration of the CSNFs was 1.5%, the additive amount of the silver nitrate aqueous solution was 3 mL, and the additive amount of the sodium boron hydride aqueous solution was 3 mL. Then, electron microscope observation and spectral absorption spectrum measurement of the obtained flat plate-like silver/finely-disintegrated cellulose complex were carried out through methods similar to those of the Example 1. The results are shown in Table 1 and FIG. 6.

Comparative Example 1

An experiment is carried out under conditions similar to those of the Example 1 except that a polyvinyl alcohol (PVA) aqueous solution having a concentration of 1% was used instead of the CSNF water dispersion liquid having a concentration of 1%. Then, electron microscope observation and spectral absorption spectrum measurement of the obtained composition were carried out through methods similar to those of the Example 1. The results are shown in Table 1 and FIG. 6.

Comparative Example 2

An experiment was carried out under conditions similar to those of Example 1 except that a sodium polyacrylate (PAANa) aqueous solution having a concentration of 1% was used instead of the CSNF water dispersion liquid having a concentration of 1%. Then, electron microscope observation and spectral absorption spectrum measurement of the obtained composition were carried out through methods similar to those of the Example 1. The results are shown in Table 1 and FIG. 6.

TABLE 1

| | Material for forming complex with silver/solid content concentration | $AgNO_3$ additive amount (mL) | $NaBH_4$ additive amount (mL) | Peak wavelength (nm) |
|---|---|---|---|---|
| Example 1 | CSNF/1% | 2.0 | 2.0 | 758 |
| Example 2 | CSNF/1% | 1.0 | 2.0 | 832 |
| Example 3 | CSNF/1% | 0.5 | 2.0 | 966 |
| Example 4 | CSNF/1.5% | 3.0 | 3.0 | 724 |
| Comparative Example 1 | PVA/1% | 1.0 | 2.0 | 420 |
| Comparative Example 2 | PAANa/1% | 1.0 | 2.0 | 422 |

As shown in FIGS. 3A and 3B, even after the fractionation and refinement process with centrifugal separation, it was confirmed that the CSNF was bonded to the flat plate-like silver fine particle. In addition, there were no appearances of the presence of CSNF by itself on other portions of the silicon wafer. Hence, it was indicated that the silver and the CSNF were completely bonded to each other and were inseparable.

In addition, as shown in FIG. 4, since the shape of the flat plate-like silver viewed from the cross-sectional direction was a rectangle, and the length thereof in the minor axis direction was approximately 10 nm, it was found that the flat plate-like silver was a flat plate-like particle having a thickness of approximately 10 nm. Since the thickness was approximately 10 nm in any sample of the Examples 1 to 4, it was indicated that only the size in the direction parallel to the flat surface can be selectively controlled depending on only the difference of the additive amount of the silver nitrate aqueous solution.

In addition, as shown in FIG. 9, from the result of the elemental mapping based on energy dispersive X-ray spectrometry, it was indicated that Ag and C were selectively contained in a fine particle portion observed in the SEM image. In combination with the result of FIG. 3A, it was indicated that CSNF was incorporated into the flat plate-like silver nanoparticle to form the complex, and the flat plate-like silver nanoparticle and the CSNF were inseparable as was expected.

From the above results, it was indicated that the complexes of silver and finely-disintegrated cellulose contained in the dispersion liquids obtained in the Examples 1 to 4 were complexes in which a flat plate-like silver nanoparticle and CSNF were completely bonded to each other, and were environmentally conscious new optical materials using carbon neutral materials.

In addition, the diameters obtained by approximating the flat plate-like silver nanoparticles in the images shown in FIGS. 5A to 5F by circles were calculated as particle sizes in the planar direction. The particle sizes in the planar direction of the Examples were compared with each other. As a result, a number of flat plate-like silver fine particle/finely-disintegrated cellulose complexes were observed which had a particle size of approximately 80 to 120 nm in the Example 1, a particle size of approximately 100 to 150 nm in the Example 2, a particle size of approximately 100 to 250 nm in the Example 3, and a particle size of approximately 80 to 120 nm in the Example 4.

FIG. 6 is a diagram illustrating spectral transmission spectra of the complexes of the flat plate-like metal fine particle and the CSNFs prepared in the Examples 1 to 4 and the Comparative Examples 1 to 2.

As shown in Table 1 and FIG. 6, it was confirmed, from the results of measurement of the spectral transmission spectra, that the absorption peaks of the obtained dispersion liquids were 758 nm in Example 1, 832 nm in Example 2, 966 nm in example 3, and 724 nm in Example 4. That is, it was confirmed that, in the complex of the flat plate-like silver fine particle and the finely-disintegrated cellulose, as the aspect ratio (particle diameter/particle thickness) increases, the absorption peak wavelength shifts to the long-wavelength region, whereby the complex can be used as a near-infrared-absorbing material.

In addition, the absorption peak in the Example 4 was 724 nm and was substantially equal to that in the Example 1, the transmittance in the Example 4 was lower than that in the Example 1. This is because, at the time of manufacture, the concentration of the complexes contained in the dispersion liquid increased due to the increases of the CSNF concentration and the amount of charge of the silver nitrate aqueous solution.

Figure 7A:
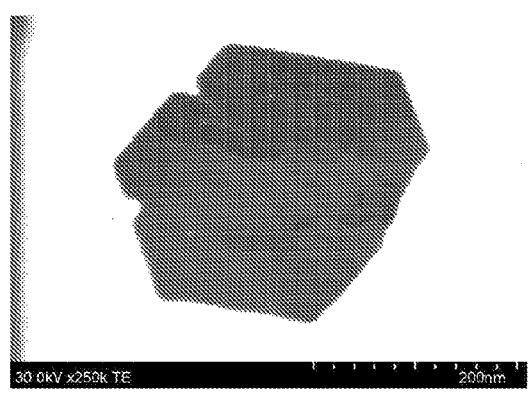
FIG. 7A shows an STEM image showing a result of observation of the complex, which is obtained in the Example 3, in an enlarged state by means of the scanning transmission electron microscope (STEM).
Figure 7B:
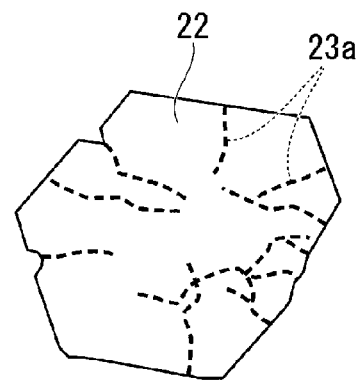
FIG. 7B is a schematic view of FIG. 7A.
Figure 8A:
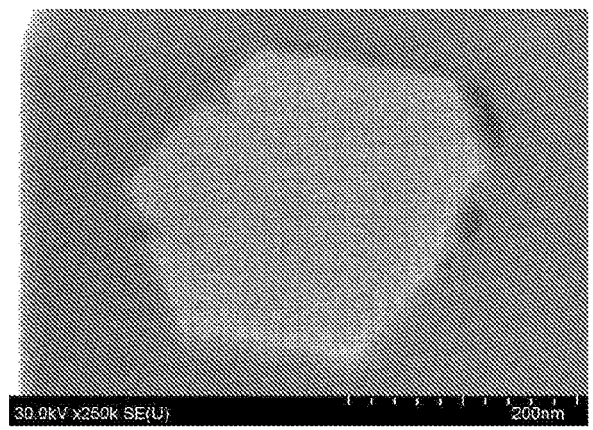
FIG. 8A shows an SEM image showing a result of observation of the complex, which is obtained in the Example 3, in an enlarged state by means of the scanning electron microscope (SEM).
Figure 8B:
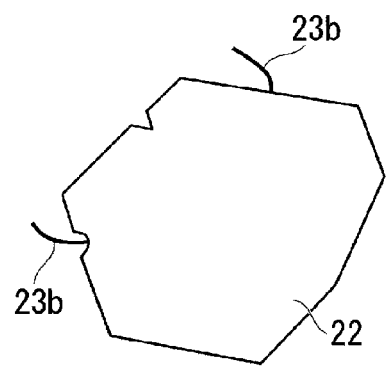
FIG. 8B is a schematic view of FIG. 8A.

In addition, FIG. 7A shows the result of STEM imaging performed so that the complex of the flat plate-like silver and the finely-disintegrated cellulose obtained in the Example 3 is enlarged. FIG. 8A shows the result of SEM imaging performed so that the complex is enlarged. FIG. 7A shows an STEM image obtained by observing the complex obtained in the Example 3 so as to be enlarged by the scanning transmission electron microscope (STEM). FIG. 7B is a schematic view of the STEM image of FIG. 7A. FIG. 8A shows an SEM image obtained by observing the complex obtained in the Example 3 so as to be enlarged by the scanning electron microscope (SEM). FIG. 8B is a schematic view of the SEM image of FIG. 8A.

As shown in FIG. 7A, fibrous traces, which seemed to be derived from the CSNFs and were involved in a silver crystal portion, were observed. In addition, in the schematic view shown in FIG. 7B, the silver crystal portion is denoted by a sign 22. The fibrous traces, which seem to be derived from the CSNFs, are denoted by a sign 23a.

As shown in FIG. 8A, fibrous traces, which seemed to be derived from the CSNFs and were exposed from a silver crystal portion, were observed. In addition, in the schematic view shown in FIG. 8B, the silver crystal portion is denoted by a sign 22. The fibrous traces, which seem to be derived from the CSNFs, are denoted by signs 23b.

Note that, from the dispersion liquids containing flat plate-like silver fine particle/finely-disintegrated cellulose complexes prepared in the Examples 1 to 4, spherical silver nanoparticles can be removed by a centrifugation process. Hence, it was confirmed that optical transparency of the visible light region can be increased while the absorbance of the near-infrared region is maintained.

Meanwhile, in the Comparative Examples 1 and 2, only the spherical silver fine particle was confirmed in the electron microscope observation, and, also in the spectral transmission spectra, only an absorption peak in the vicinity of 420 nm derived from a resonance peak of the spherical silver fine particle was detected (refer to Table 1). That is, it was indicated that, in the present reaction, the CSNF was an essential material for advancing anisotropic growth of the metal fine particle and controlling the shape thereof, that is, a shape control material. The detailed mechanism of this is unknown. However, the PAANa used in the Comparative Example 2 does not function as a shape control material though it contains a number of carboxyl groups as in the case of the CSNF. Hence, it can be considered that the structure of the carboxyl groups densely fixed and regularly arranged on the crystal surface of the CSNF is a factor for inducing the anisotropic growth of the silver fine particle.

Example 5

An experiment was carried out under conditions similar to those of the Example 1 except that a 20 mM chlorauric acid aqueous solution was used instead of the silver nitrate aqueous solution. Electron microscope observation of the obtained composition was carried out according to a method similar to that of the Example 1.

Example 6

An experiment was carried out under conditions similar to those of the Example 1 except that a 15 mM chloroplatinic acid aqueous solution was used instead of the silver nitrate aqueous solution. Electron microscope observation of the obtained composition was carried out according to a method similar to that of the Example 1.

From the results of the electron microscope observations of the compositions obtained in the Example 5 and the Example 6, in the Example 5, a complex of finely-disintegrated cellulose and a gold fine particle having a flat-plate shape (flat plate-like gold fine particle) and having a particle size of approximately 50 to 100 nm was observed. In addition, in the example 6, a complex of finely-disintegrated cellulose and a platinum fine particle having a flat-plate shape (flat plate-like platinum fine particle) and having a particle size of approximately 40 to 80 nm was observed.

Comparative Example 3

According to the Example 3 disclosed in Patent Literature 6, a dispersion liquid containing flat plate-like silver nanoparticles was prepared.

That is, 15 mL of an ethylene glycol solution of 800 mM of polyvinyl pyrrolidone (PVP) (K30, mass average molecular weight 40000) was added to 15 mL of an ethylene glycol solution of 50 mM silver nitrate (manufactured by KANTO CHEMICAL CO., INC). This reaction solution was heated at 130° C. for one hour and was stirred by a hot stirrer, whereby the colorless reaction solution turned to blue. After the reaction solution was cooled, the reaction solution was diluted with five times the volume of water, and was refined by centrifugal separation (10500 rpm×30 minutes), whereby a flat plate-like silver nanoparticle dispersion liquid was prepared.

For the obtained dispersion liquid, electron microscope observation of the obtained composition was carried out through a method similar to that of the Example 1 (refer to FIGS. 5A to 5F). As a result, a number of flat plate-like silver nanoparticles were observed which had a particle size of approximately 100 to 150 nm as a particle size in the planar direction.

Dispersion Stability Evaluation of Dispersion Liquids

After the refined dispersion liquids obtained in the Examples 1 to 4 and the Comparative Example 3 are preserved in a refrigerator at 4° C. for one month, the presence or absence of precipitates was confirmed by visual observation. The results are shown in Table 2.

TABLE 2

|  | Particle size (nm) | Presence/absence of settling after 1 month preservation |
| --- | --- | --- |
| Example 1 | 80 to 120 | absent |
| Example 2 | 100 to 150 | absent |
| Example 3 | 100 to 250 | absent |
| Example 4 | 80 to 120 | absent |
| Comparative Example 3 | 100 to 150 | present |

As shown in FIG. 2, in the dispersion liquid in the Comparative Example 3 in which the dispersion liquid containing the flat plate-like silver nanoparticles was produced by using the polyol process, it was confirmed that the silver nanoparticles were settled one month later in the dispersion stability test. This indicates that, in the Comparative Example 3, the flat plate-like silver nanoparticles having a large particle size cannot be prevented from settling only by water-soluble polymers such as polyvinyl pyrrolidone protecting the surfaces of the silver nanoparticles.

Meanwhile, in the dispersion liquids obtained in the Examples 1 to 4, settling of the silver nanoparticles was not found even one month later, and good dispersibility was maintained. This is due to electrostatic repulsion derived from high density carboxy present on the surfaces of the CSNFs bonded to the flat plate-like silver nanoparticle.

Figure 10:
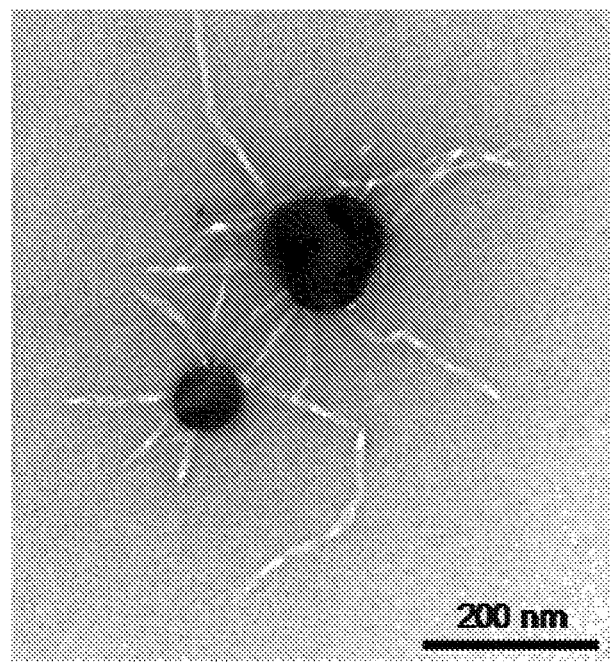
FIG. 10 shows a TEM image of negatively-stained complexes of the flat plate-like metal fine particles and CSNFs according to the present embodiment.

In addition, after the prepared flat plate-like metal fine particle/CSNF complex was refined by a dialysis treatment and a centrifugation process, TEM observation was carried out through a negative staining method using uranyl acetate. A JEM1400Plus (JEOL Ltd.) transmission electron microscope was used. The accelerating voltage was 100 kV. As shown in FIG. 10, due to the negative staining effect, the flat plate-like metal fine particles and the CSNFs bonded thereto were clearly observed in the same field of view. In addition, the CSNFs observed in the present observation sample were bonded to the flat plate-like metal fine particle without fail, and no free CSNFs, i.e. not bonded to the flat plate-like metal fine particle, were observed. This result is the evidence of an aspect of the present complex in which the plate-like metal fine particle and the CSNFs are bonded to each other in an inseparable state.

As described above, using the present invention can obtain a dispersion liquid containing a flat plate-like metal fine particle/finely-disintegrated cellulose complex, which has not been reported. Since the dispersion liquid selectively absorbs light having any wavelength ranging from visible light to near-infrared light, the dispersion liquid can be utilized as a composition for forming a new optical material. In addition, since the flat plate-like metal fine particle contained in the dispersion liquid is bonded to finely-disintegrated cellulose, a good dispersed state can be kept on a long-term basis.

INDUSTRIAL APPLICABILITY

According to the present invention, by a simple process with a low environmental load using a biomass material, there can be provided a complex of a flat plate-like metal fine particle and finely-disintegrated cellulose, a dispersion liquid containing the complex of a flat plate-like metal fine particle and finely-disintegrated cellulose, and a method for producing the same, in addition to a new optical material available for a functional color material and a near-infrared-absorbing material. In addition, the complex of a flat plate-like metal fine particle and finely-disintegrated cellulose is a new carbon-neutral organic-inorganic hybrid material, which has not been reported. The dispersion liquid containing the complex of a flat plate-like metal fine particle and finely-disintegrated cellulose is a composition for forming a new optical material applicable to a near-infrared-absorbing material and a heat shielding material, for example, a coating fluid for forming a heat barrier on a film. In addition, possible application of the new optical material includes a special paint, a security material, an optical sensor, a dye-sensitized solar cell, a member for antibacterial medical care, and an antibacterial additive for personal care products, and is expected to have ripple effects on various fields.

REFERENCE SIGNS LIST

1 . . . complex
2 . . . flat plate-like metal fine particle (flat plate-like silver fine particle)
3 . . . finely-disintegrated cellulose (CSNF)
3a . . . portion incorporated into the flat plate-like metal fine particle
3b . . . portion exposed from the surface of the flat plate-like metal fine particle

What is claimed is:

1. A complex comprising:
a flat plate-like metal fine particle formed of at least one metal or metal species; and at least one piece of finely-disintegrated cellulose combined with the flat plate-like metal fine particle,
wherein at least a part of each piece of the finely-disintegrated cellulose is incorporated into the flat plate-like metal fine particle, and a remaining part is exposed from a surface of the flat plate-like metal fine particle,
wherein a method for producing the complex of the plate-like metal fine particle and the finely-disintegrated cellulose, comprising the steps of:

preparing finely-disintegrated cellulose;

dispersing the finely-disintegrated cellulose in a solvent to obtain a finely-disintegrated cellulose dispersion liquid;

mixing the finely-disintegrated cellulose dispersion liquid with a solution containing metal ions to obtain a mixed solution;

reducing and precipitating the metal ions in the mixed solution to grow the flat plate-like metal fine particle, and combining the flat plate-like metal fine particle and the finely-disintegrated cellulose with each other;

wherein the finely-disintegrated cellulose has a content of carboxyl group between 0.1 mmol or more and 5.0 mmol or less per 1.0 g of cellulose on a crystal surface of the finely-disintegrated cellulose, and an amount of the metal ions during the reduction and precipitation step is 0.002 mmol or more and 0.1 mmol or less with respect to 1.0 g of the finely-disintegrated cellulose, and wherein the finely-disintegrated cellulose dispersion liquid has a maximum value of absorbance with respect to a given wavelength in a range of a wavelength of 400 nm or more and 1500 nm or less.

2. The complex of claim 1, wherein the flat plate-like metal fine particle and the finely-disintegrated cellulose are inseparable.

3. The complex of claim 1, wherein the flat plate-like metal fine particle is silver.

4. The complex of claim 1, wherein the flat plate-like metal fine particle has a particle diameter that is two times or more larger than a particle thickness of the flat plate-like metal fine particle.

5. The complex of claim 1, wherein the finely-disintegrated cellulose has a crystal structure of cellulose type I.

6. The complex of claim 1,
wherein the finely-disintegrated cellulose has a fibrous form derived from a microfibril structure of native cellulose.

7. The complex of claim 1,
wherein the finely-disintegrated cellulose has a number average minor axis diameter of 1 nm or more and 100 nm or less, and a number average major axis diameter of 50 nm or more, the number average major axis diameter being 10 times or more longer than the number average minor axis diameter.

8. A dispersion liquid including the complex of claim 1, the complex being dispersed in water or an organic solvent.

9. An optical material including the complex of claim 1.

10. The complex of claim 1, wherein the carboxyl group is introduced by an oxidation reaction using an N-oxyl compound.

* * * * *